(12) United States Patent
Kavanau et al.

(10) Patent No.: US 9,792,518 B2
(45) Date of Patent: *Oct. 17, 2017

(54) METHOD AND SYSTEM FOR ALIGNING AND CLASSIFYING IMAGES

(71) Applicant: Christopher L. Kavanau, Allentown, PA (US)

(72) Inventors: Christopher L. Kavanau, Allentown, PA (US); Luisa Montesano, Santa Monica, CA (US)

(73) Assignee: Christopher L. Kavanau, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,836

(22) Filed: Jun. 22, 2015

(65) Prior Publication Data
US 2016/0070969 A1 Mar. 10, 2016
US 2017/0249523 A9 Aug. 31, 2017

Related U.S. Application Data

(63) Continuation of application No. 13/960,231, filed on Aug. 6, 2013, now Pat. No. 9,064,188, which is a
(Continued)

(51) Int. Cl.
| | |
|---|---|
| *G06K 9/32* | (2006.01) |
| *G06K 9/00* | (2006.01) |
| *G06K 9/62* | (2006.01) |
| *G06T 3/60* | (2006.01) |
| *G06T 5/00* | (2006.01) |

(Continued)

(52) U.S. Cl.
CPC .......... *G06K 9/32* (2013.01); *G06K 9/00134* (2013.01); *G06K 9/6217* (2013.01); *G06K 9/6251* (2013.01); *G06T 3/60* (2013.01); *G06T 5/002* (2013.01); *G06T 7/11* (2017.01); *G06T 19/20* (2013.01); *G06K 2209/403* (2013.01);
(Continued)

(58) Field of Classification Search
USPC ................................................. 382/294, 285
See application file for complete search history.

(56) References Cited

U.S. PATENT DOCUMENTS

| | | |
|---|---|---|
| 5,568,384 A | 10/1996 | Robb et al. |
| 5,613,013 A | 3/1997 | Schuette |

(Continued)

OTHER PUBLICATIONS

Bauer, et al., "Growing a Hypercubical Output Space in a Self-Organizing Feature Map", Jul. 1995, Publisher: International Computer Science Institute, Published in: US.
(Continued)

*Primary Examiner* — Ishrat I Sherali
(74) *Attorney, Agent, or Firm* — Loginov & Associates; William A. Lovinov

(57) ABSTRACT

In one embodiment, L dimensional images are trained, mapped, and aligned to an M dimensional topology to obtain azimuthal angles. The aligned L dimensional images are then trained and mapped to an N dimensional topology to obtain $2^N$ vertex classifications. The azimuthal angles and the $2^N$ vertex classifications are used to map L dimensional images into 0 dimensional images.

1 Claim, 22 Drawing Sheets

Related U.S. Application Data continuation of application No. 11/579,481, filed as application No. PCT/US2005/015872 on May 6, 2005, now Pat. No. 8,503,825.

(60) Provisional application No. 60/569,361, filed on May 6, 2004.

(51) Int. Cl.
*G06T 19/20* (2011.01)
*G06T 7/11* (2017.01)

(52) U.S. Cl.
CPC ............... *G06T 2207/20216* (2013.01); *G06T 2219/2004* (2013.01)

(56) References Cited

U.S. PATENT DOCUMENTS

| | | | |
|---|---|---|---|
| 6,038,337 A | 3/2000 | Lawrence | |
| 6,278,799 B1 | 8/2001 | Hoffman | |
| 6,549,200 B1 | 4/2003 | Mortlock et al. | |
| 6,694,049 B1 | 2/2004 | Woodall | |
| 6,959,109 B2 | 10/2005 | Moustafa | |
| 7,197,179 B2 | 3/2007 | Rubbert et al. | |
| 7,483,590 B2 | 1/2009 | Nielsen et al. | |
| 7,545,975 B2 | 6/2009 | Kise | |
| 7,961,182 B2 | 6/2011 | Tachi et al. | |
| 8,027,532 B2 | 9/2011 | Marcon et al. | |
| 8,503,825 B2 * | 8/2013 | Kavanau | G06K 9/00134 382/216 |
| 8,655,041 B2 * | 2/2014 | John | A61B 6/481 382/130 |
| 9,064,188 B2 * | 6/2015 | Kavanau | G06K 9/00134 |
| 9,122,950 B2 * | 9/2015 | Han | |
| 2003/0018457 A1 | 1/2003 | Lett et al. | |
| 2007/0248251 A1 * | 10/2007 | Liao | G06K 9/00208 382/128 |
| 2014/0297199 A1 * | 10/2014 | Osten | G01N 33/5014 702/19 |
| 2015/0042646 A1 * | 2/2015 | Comaniciu | G06T 17/20 345/420 |

OTHER PUBLICATIONS

Zampighi, et al., "The Kohonen Self-Organizing Map: A Tool for the Clustering and Alignment of Single Parties Images Using Random Conical Tilt", "Journal of Structural Biology", Jan. 15, 2004, pp. 368-380, vol. 146, Publisher: Elsevier, Published in: US.

Donate, et al., "A Novelneuralnetwork Technique for Analysis and Classification of EM Single-Particle Images", "Journal of Structual Biology", Feb. 2001, pp. 233-245, vol. 133, No. 2-3, Publisher: Elsevier, Published in: US.

Marabini, et al., "Pattern Recognition and Classification of Images of Biological Macromolecules Using Artificial Neural Networks", "Biophysical Journal", Jun. 1994, pp. 1804-1814, vol. 66, Publisher: The Biophysical Society, Published in: US.

* cited by examiner

| SNR | Infinity | 0.95 | 0.47 | 0.32 | 0.24 | 0.19 |
|---|---|---|---|---|---|---|
| N = 4 | 0.0% | 0.0% | 0.0% | 0.0% | 14.1% | 45.1% |
| N = 3 | 0.0% | 0.0% | 0.0% | 12.5% | 35.7% | 58.3% |
| N = 2 | 0.0% | 0.0% | 9.1% | 31.8% | 48.0% | 60.0% |
| N = 1 | 0.0% | 5.9% | 38.3% | 47.2% | 57.7% | 68.2% |

FIG. 1G

| | CYLINDER | N = 1 | N = 2 | N = 2 (ALTERNATE) | N = 3 |
|---|---|---|---|---|---|
| CLASS A | | |  | |  |
| CLASS B |  | |  |  |  |
| CLASS C | |  |  |  |  |
| CLASS D | | |  | |  |
| CLASS E | |  | | <br> |  |
| CLASS F |  | | | |  |

METHOD AND SYSTEM FOR ALIGNING AND CLASSIFYING IMAGES

RELATED APPLICATION DATA

This application is a continuation of co-pending U.S. patent application Ser. No. 13/960,231, filed Aug. 6, 2013, entitled METHOD AND SYSTEM FOR ALIGNING AND CLASSIFYING IMAGES, which is a continuation of co-pending U.S. patent application Ser. No. 11/579,481, filed Sep. 16, 2008, entitled METHOD AND SYSTEM FOR ALIGNING AND CLASSIFYING IMAGES, now U.S. Pat. No. 8,503,825, issued Aug. 6, 2013, which is a PCT National Phase Application of PCT Application Serial No. PCT/US05/15872, filed May 6, 2005, entitled METHOD AND SYSTEM FOR ALIGNING AND CLASSIFYING IMAGES, which claims the benefit of U.S. Provisional Application Ser. No. 60/269,361, filed May 6, 2004, the entire disclosure of each which applications is herein expressly incorporated by reference.

GOVERNMENT SUPPORT

This invention was made with government support of Grant No. EY04 1 10, awarded by the NIH. The government may have certain rights in this invention.

BACKGROUND OF THE INVENTION

Field of the Invention

The present invention relates generally to alignment and classification procedures and more specifically to alignment and classification procedures without a dependence on reference elements.

Background Information

The 3D (3 dimensional) structures of macromolecules can be investigated by single particle analysis, a powerful technique of electron microscopy that provides more penetrating structural analyses of macromolecules whose x-ray crystallography is problematical. Resolution and analyses of molecular interactions and conformational changes, using single particle analysis, have been advancing in pace with the image processing methods employed (Ueno and Sato, 2001). Such methods are needed because imaged macromolecules are obscured by noise backgrounds (with SIN ratios [SNR] often below unity). Noise has its origin partly in the low irradiation levels used to minimize specimen damage. To attenuate noise, one must average the 2D images with the same 3D orientations, a process requiring optimal alignments among the gallery of data set images. Signals then reinforce one another, and noise tends to average out.

As with other techniques of 3D reconstruction, 2D image alignment is critical when applying the RCT (random conical tilt) method to fixed particles, imaged either '"face up" or "face down" in a membrane bilayer or film. To recover 3D information coherently, one must know the rotational orientation of each data set image in the plane of the bilayer. This is normally accomplished by bringing untilted images {those viewed '"head on" at 0°) into a common rotational alignment. Once relative rotational orientations (the amounts of rotation of given images required to bring them into common alignment) are known for untilted images, they also become known for tilted images, because of pairwise imaging. Single particle analysis should, in principle, achieve atomic resolution. In practice, however, various circumstances prevent this.

Normally, one assumes the existence of a prototype reference image, against which the data set images can be aligned. However, this assumption is unjustified for inhomogeneous data sets. Another problem is that alignments are biased by the choice of reference images. One method to reduce this bias is to average the images aligned to a particular reference, to yield a revised reference (Penczek et al., 1992). However, when the images have a poor SNR, or represent different views of the same macromolecule, this procedure yields a final averaged reference that shares features of the original reference. '"Iterative reference free alignment," selects and aligns two images at random. The process is then repeated with a third selected image, etc., until the data set images have been exhausted (Penczek et al., 1992). However, because the order of selection biases results, the process is repeated with random orders of selection, thereby reducing the bias because this method uses a changing global average for reference, it is not strictly reference free (van Heel et al., 2000).

The '"state of the art" technique for generating and aligning reference images representing different views of a data set, is designated "Multivariable Statistical Analysis/Multi Reference Alignment" (MSA/MRA; see Zampighi et al., 2004). Some variations between data set images may not reflect structural differences, but merely positional differences (e.g., in plane rotational orientation, in the case of RCT). For that reason, it is undesirable, when classifying data sets, to consider in plane rotational differences to be valid. Consequently, before classification, images must be brought into mutual rotational alignment, thereby eliminating particle orientation as an independent classification variable.

However, alignments using correlation based techniques are only well defined operations when galleries of images are homogeneous. But to produce representative classes, data set images must first be aligned, which requires an initial set of representative classes. To cope with this "circularity," workers have resorted to iterative cycles of classification and alignment using MSA/MRA, until results stabilize. However, this procedure does not guarantee attainment of the global minimum of the "energy" function. In addition to these shortcomings, MSA/MRA hinges on subjective operator choices of many critical free variables that impact the final result. Consequently, such results typically are operator dependent. Finally, MSA/MRA often consumes months of processing (Bonetta, 2005).

In one embodiment, the technique developed here aligns, or orients, data set images produced by RCT by directly classifying their relative in plane rotational orientations, without rotating images into "alignment" with references, common to the above described techniques. Instead of starting with selected reference image(s), one typically starts with over 8 million random pixel values. Coupling this procedure with a sufficiently small influence of the data during each training cycle, eliminates training bias because the alignment results become independent of the order of the images used to train the network.

This alignment procedure bypasses the need for alternate cycles of alignment and classification in order to achieve alignment. It simultaneously classifies both structural differences and rotational orientations of images during each training cycle. It is a self organizing process, performed on the surface of a cylindrical array of artificial neurons. After reference free alignment, a more detailed classification according to structural differences may be required. Zampighi et al. (2004) found that vertices of the square planar SOMs' (self organizing maps') map differing views of RCT imaged particles embedded in a membrane bilayer. But the homogeneity of vertex partitions generated by a 2-CUBE SOM is imperfect when the SNRs are low, or the data sets are heterogeneous. Also, the number of vertex classes is limited to four. To obviate the heterogeneity arising from 2D SOMs, and lesser restrictions on the number of vertex classes, we developed a method called "N Dimensional vertex partitioning" with which a data set's principal classes "migrate" to the vertices of ND (N dimensional) hypercubical arrays. Because an ND hypercube has $2^N$ vertices, it partitions $2^N$ vertex classes.

We found that, as the dimension is stepped up (at least to a value of N=4), the average homogeneity of the vertex classes improves. This likely eventuates from the high degree of data compression that occurs in mapping high D data onto low D grids. The higher the grid dimension, the less the data compression, and the greater the resulting homogeneity. If the operator desires two vertex classes of the data set, a value of N=1 is selected, for four vertex classes, a value of N=2, for eight vertex classes, a value of N=3, etc. This allows one to control the number and homogeneity of the generated vertex classes.

In one embodiment, we call the combination of these reference free methods, SORFA, for "Self Organizing, Reference Free Alignment." SORFA benefits from the intrinsically parallel architecture and topology/metric conserving characteristics of self-organizing maps. Here we demonstrate SORFA using the Kohonen self organizing artificial neural network, an unsupervised method of competitive learning that employs no target values decided upon in advance (Deco and Obradovic, 1996). The inspiration and methodology for this type of network are based on the circumstance that most neural networks comprising the mammalian brain exist in 2D arrays of signal processing units. The network's response to an input signal is focused mainly near the maximally excited neuron.

In one embodiment, SORFA uses this methodology to classify images according to azimuthal orientations and structural differences. It benefits from the SOMs' insensitivity to random initial conditions. Further, for alignment there are only two critical free parameters: learning rate, and circumference/height ratio of the cylinder. SORFA's speed benefits from its intrinsically parallel architecture. A data set of 3,361 noisy, heterogeneous electron microscopical {EM} images of Aquaporin 0 (AQP0), for example, was better aligned in less than 9 min, than was a MSA/MRA run requiring six months. SORFA was far simpler to use, and involves far fewer chances for operator error, as was suspected in the above six month MSA/MRA alignment. These AQP0 channels were from the plasma membranes of native calf lens fibers, which are tetramers, 64 Å on a side, MW~118 kDs (Konig et al., 1997).

Images of the AQP0 channel obtained by RCT geometry already have been aligned and classified using the alignment through classification approach (Zampighi et al., 2003). By using knowledge gained in applying SORFA to test images, we aligned and classified the AQP0 images. Finally, we compared the structure of the 3D reconstructions to the atomic model of Aquaporin I (AQP I), a closely related and structurally similar channel with 43.6% identity and 62.6% similarity to AQP0 (Gonen et al., 2004).

BRIEF DESCRIPTION OF THE FIGURES

FIG. 1G illustrates the effect of noise on vertex-class contamination, according to one embodiment of the invention.

DETAILED DESCRIPTION OF EMBODIMENTS OF THE INVENTION

1. Overview Figures

Figure 1A:
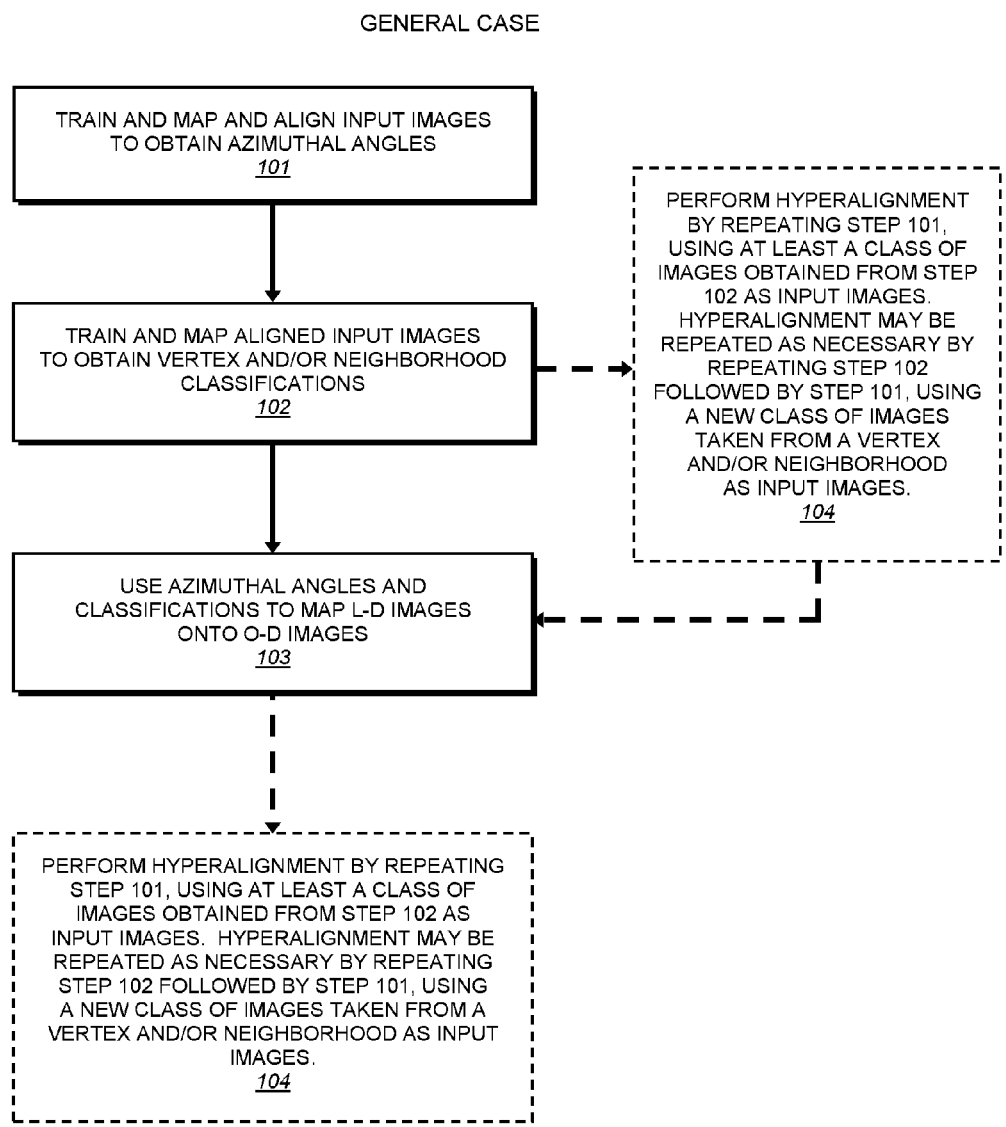
FIGS. 1A-1F illustrate flowcharts illustrating a reference-free method for aligning and classifying images, according to one embodiment of the invention.
Figure 1B:
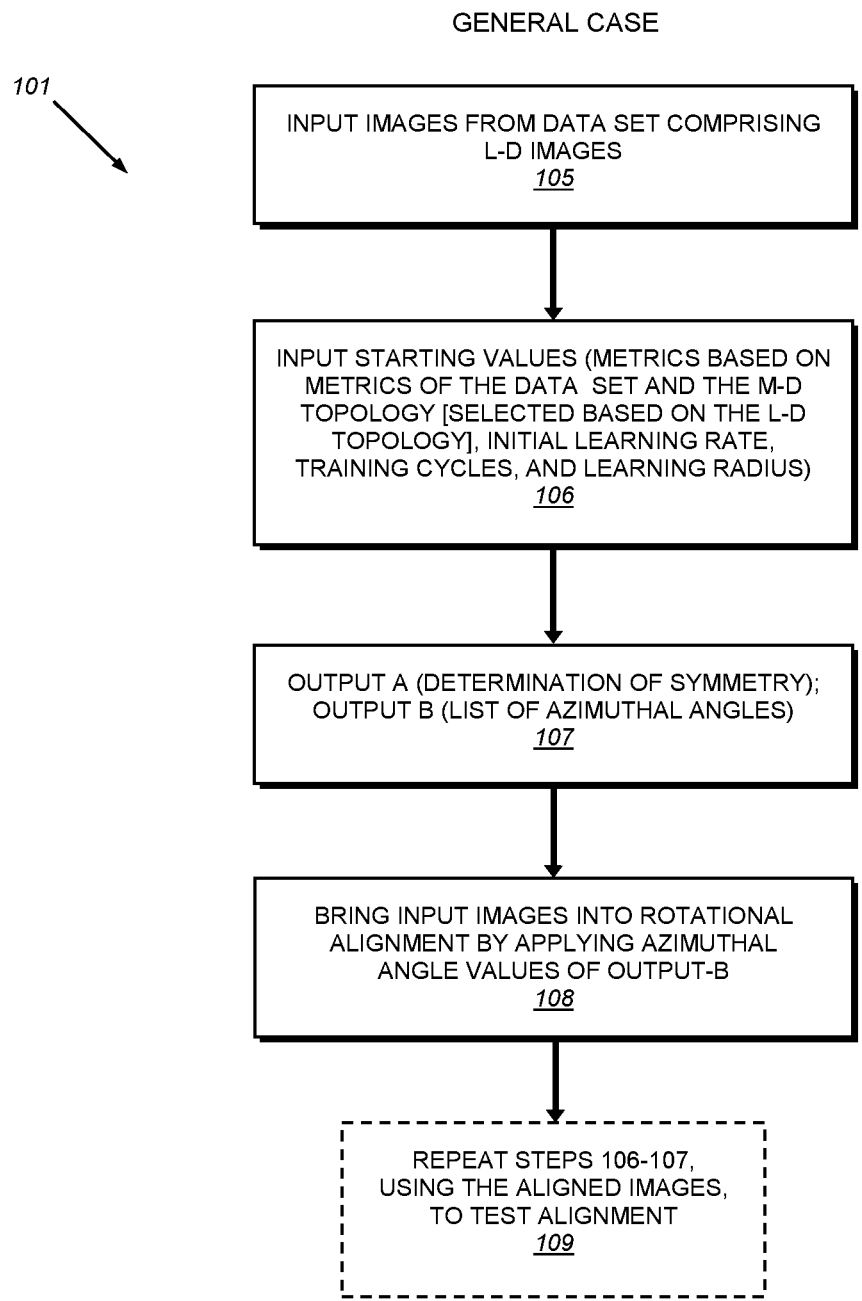
Figure 1C:
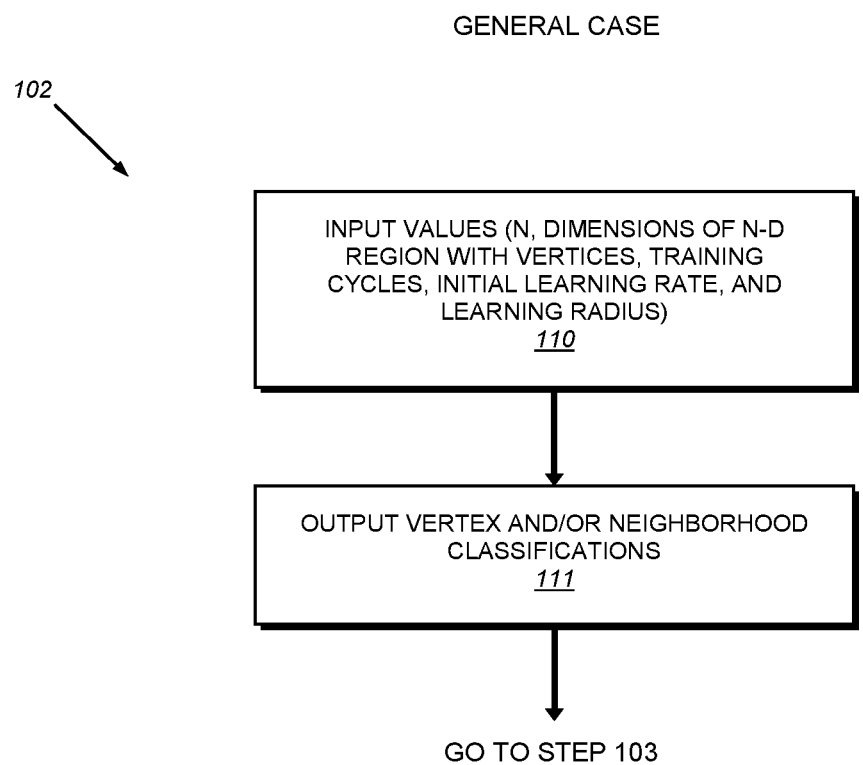
Figure 1D:
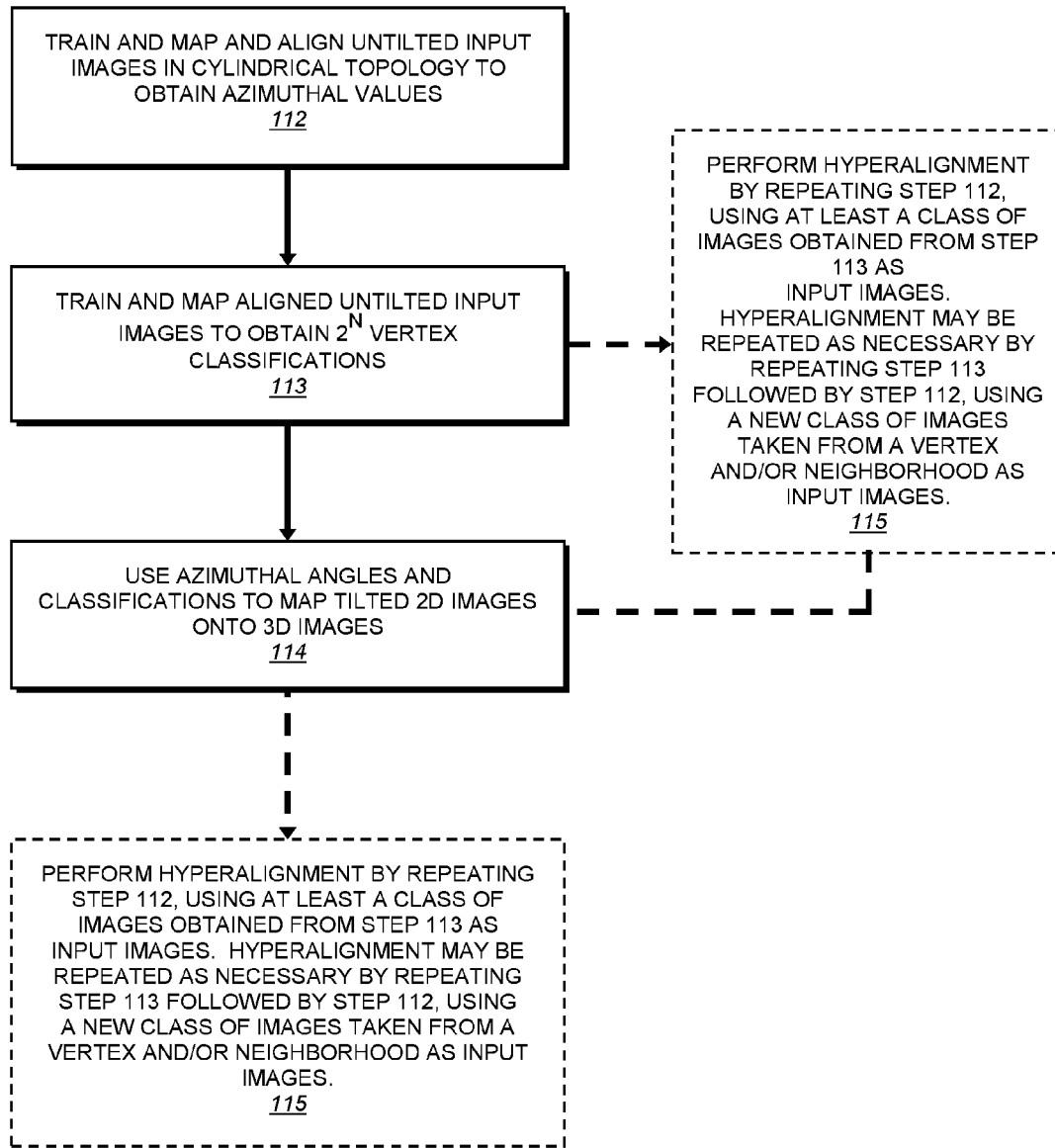
Figure 1E:
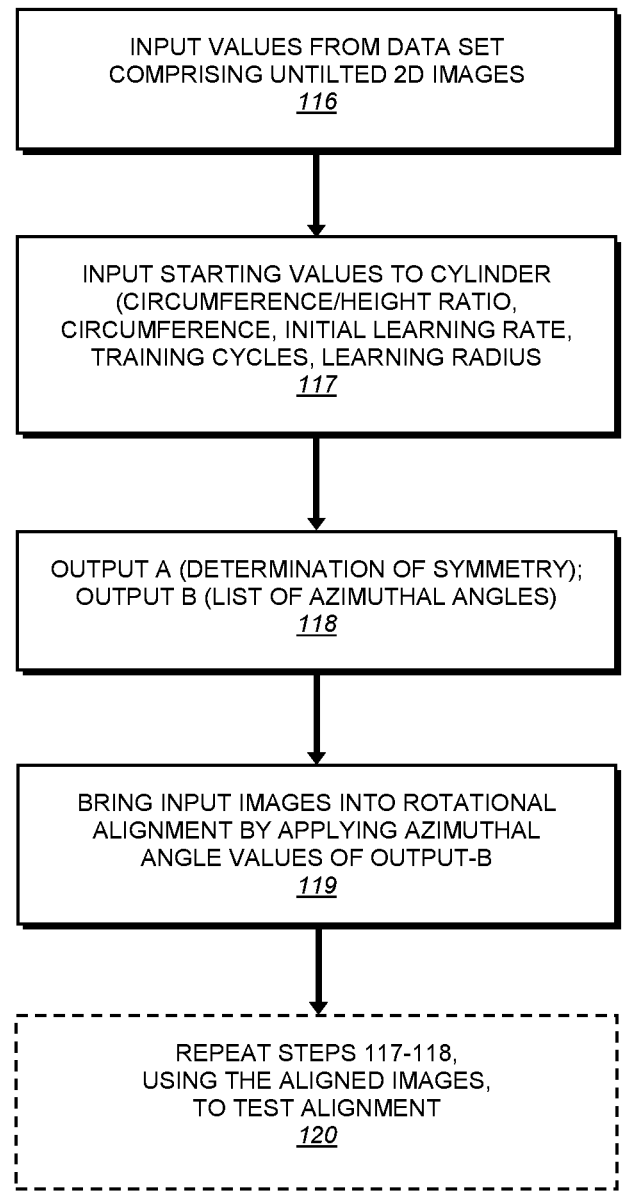
Figure 1F:
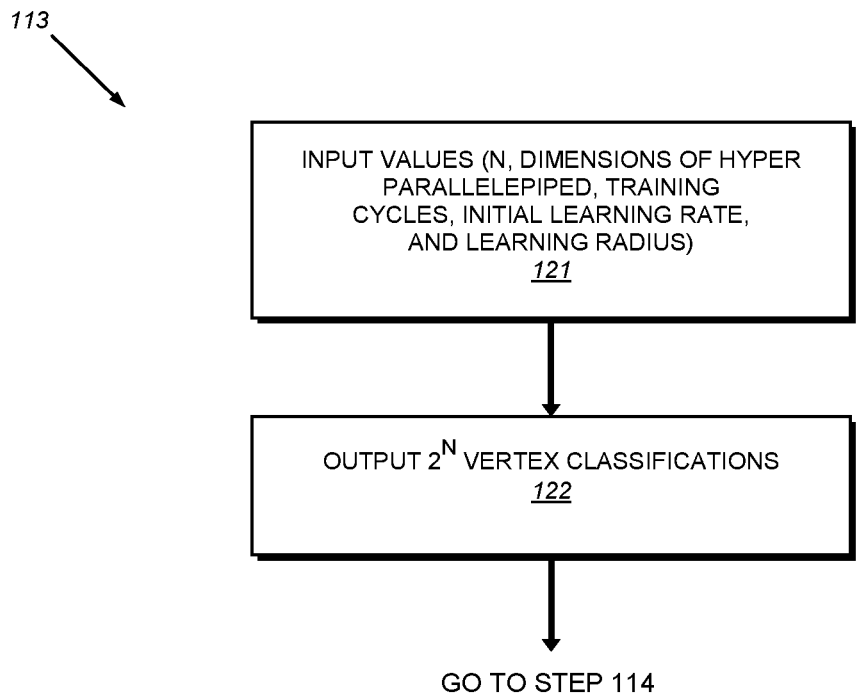

FIGS. 1A-1F illustrate a method of aligning and classifying images, according to one embodiment of the invention. In one embodiment, a reference-free procedure is performed to circumvent a dependence on reference elements common to other correlation-based alignment procedures. FIGS. 1A-1C illustrates a general process, and FIGS. 1D-1F illustrate a specific example, using AQP0 images.

FIG. 1B sets forth details of step 101 of FIG. 1A, which trains and maps to an M dimensional topology using L dimensional images to obtain azimuthal angles. The input images are also brought into alignment by applying the calculated azimuthal angles in order to test the accuracy of the alignment. In step 105, images from a data set comprising L dimensional images are input. In step 106, metric starting values based on the M dimensional topology are input. The M dimensional topology is based on the topology of the L dimensional images (to obtain a close match). In step 107, the data set symmetry and the azimuthal angles are determined based on the input information. In step 108, the input L dimensional images are rotationally aligned by applying the azimuthal angles to the input L dimensional images. In step 109, steps 106-I07 are repeated, using the aligned images as the new input images, to determine if the azimuthal angles are correct.

FIG. 1C sets forth the details of step 102 of FIG. 1A, which trains and maps the N dimensional topology using the aligned L dimensional images to obtain vertex and/or neighborhood classifications. In step 110, the dimensions (the metrics) of the N dimensional topology, training cycles, initial learning rate, and the optional initial learning radius are input. In step 111, the vertex and/or neighborhood classifications are determined based on the input information.

As explained above, FIGS. 1D-1F illustrate an example of the method set forth in FIGS. 1A-1C, according to one embodiment of the invention. The data set Aquaporin 0 (AQP0) is used in this example. It should be stressed that this data set is only an example, and many other types of data sets may be used.

Referring to FIG. 1D, in step 112, 2 dimensional untilted images (note that L=2 in this example) are used to train and map a cylindrical topology (note that M=3 in this example) to obtain azimuthal angles. The azimuthal angles are then applied to the untilted images to produce aligned images so that the alignment can be tested and step 113 can be performed. (Note that the AQP0 data set is a random conical tilt data set, which uses untilted and tilted images.) The aligned 2 dimensional untilted images are then trained and mapped to an N dimensional topology using the aligned images to obtain $2^N$ vertex classifications in step 113. In step 114, the azimuthal angles and the $2^N$ vertex classifications are used to map 2 dimensional images into 3 dimensional images (3D reconstructions). In step 115, step 112 (the training, mapping, and aligning step) is repeated using one or more vertex class subsets obtained from step 113, in order to hyperalign the 2 dimensional data. Hyperalignment may be repeated as necessary by repeating step 113 followed by step 112, using one or more vertex classes of 2 dimensional images.

FIG. 1E sets forth details of step 112 of FIG. 1D, which trains and maps to a cylindrical topology using the L dimensional images to obtain azimuthal angles. The L-dimensional images are then brought into alignment by applying the azimuthal angles. In step 116, 3361 2 dimensional images from the AQP0 data set are input. In step 117, five starting values, based on the cylindrical topology are input: circumference to height ratio, a specific circumference based on the desired resolution of the azimuthal angles, the number of training cycles, an initial learning rate, and learning radius.

Note that in this step, SORFA (Self-Organizing Reference-Free Alignment) starts with a cylindrical topology, one that is naturally suited to classifying azimuthal angles of images obtained from random conical tilt. One starting value is known (the output grid resolution=the cylinder circumference or angular resolution desired), but two starting values must be adjusted (the initial learning rate, and the cylinder circumference to height ratio) in order to limit the error to an acceptable level as measured by the test run. The other parameters (cylinder circumference, number of training cycles and initial learning radius) are well-defined.

Note that SORFA sometimes requires lower initial learning rates with data sets of greater heterogeneity. For tests with EM images, for example, learning rates may be set to values of 0.001 or lower. A low learning rate makes it so the first few training images don't bias the network. For a discussion of the effect of the initial learning rate, see Example 2.

In step 118, the symmetry of the 2 dimensional images as well as the identity of the azimuthal angles are determined based on the input information. SORFA outputs a list of relative azimuthal angles (referred to as Output B) for all the untilted 2 dimensional images of input images along one of two mutually perpendicular axes on the surface of the cylinder of artificial neurons (the circumferential axis).

SORFA also outputs a determination of symmetry (referred to as output A) in order to properly calibrate the azimuthal axis.

In step 119, the input 2 dimensional images are rotationally aligned by applying the azimuthal angles to the input 2 dimensional images, by way of an anti-aliasing rotator.

In step 120, steps 117-118 are repeated to determine (test) if the azimuthal angles are correct. These steps are repeated using the aligned images, and the same starting values.

The test run is the reprocessing of aligned images using the same cylinder conditions, in order to determine angular consistency between runs. In the test run, the greater the deviation of the mapped image angles from the mean, the greater the relative angle deviation between corresponding images of the two runs. Therefore, one seeks the narrowest vertical band of images, stretching from top to bottom of the test cylinder. This may be expressed quantitatively as the standard deviation of the angle distribution in output B of the test run.

The new output B gives the standard deviation of the distribution of azimuths. It is than determined if the standard deviator is within an acceptable range. If no, the process moves back to step 116 and repeats, but with a modified circumference to height ratio and learning rate in step 117. If yes, the process moves to step 121.

FIG. 1F sets forth the details of step 113 of FIG. 1D, which uses the untilted 2 dimensional images to train and map to an N dimensional topology to obtain $2^N$ vertex classifications. In step 121, the value N (for example a value of N=3 will return 8 vertex classes), the edge length of the N dimensional hybercube, training cycles, and an initial learning rate and learning radius are input.

The dimension of the hypercube (or hyper-parallelepiped) is set to N for the network to return untilted images in $2^N$ vertex classes from the data set (representing $2^N$ different views of the imaged macro molecule).

In step 122, the $2^N$ vertex classifications are determined based on the input information. For a discussion on locating the vertices of the hypercube see Example 1. If only two classes are desired, they may be gleaned directly from the cylinder. No additional classification is necessary.

Embodiments of the invention have been described above, which provide a method for aligning and classifying images, comprising training, mapping, and aligning L dimensional images to an M dimensional topological array of L dimensional neuron images to obtain azimuthal angles and/or additional Euler angles; training and mapping the aligned L dimensional images to an N dimensional topological array of L dimensional neuron images with vertices to obtain vertex and/or neighborhood classifications; and mapping the L dimensional images to 0 dimensional images. In one embodiment, the initial learning rate is set to be low so that the first few images of the data set do not bias the network. In another embodiment, the alignment is based on a random rotation of input images and is thus independent of any input image's orientation, and linearly calibrates the azimuthal axis. In an additional embodiment, the circumference to height ratio is picked based on a small circumference, and the circumference is scaled up, keeping the circumference to height ratio constant, so that higher resolution azimuthal angles are obtained. In another embodiment, the training comprises morphing the L dimensional neuron images so that they are progressively greater in similarity to the input L dimensional images so that progressively smaller neighborhoods of the L dimensional neuron images, as measured in the topological space after morphing, tend to be progressively greater in similarity. In a further embodiment, the mapping is done based on the similarity between the L dimensional neuron images and the L dimensional images. In yet another embodiment, random pixel values are used for the L dimensional neuron images that morph toward the input L dimensional images. (Note that random values do not necessarily need to be perfectly random, just somewhat disordered.) In another embodiment, symmetry further comprises reviewing the mapped L dimensional images to determine how they much and in what direction the mapped L dimensional images rotate around the circumference of the cylinder, the cylinder comprising of the L dimensional neuron images. In an additional embodiment, the metrics and topologies between the L dimensional images and the M dimensional array of L dimensional neuron images are matched in order to establish meaningful coordinate systems in such spaces, which convey the angular and/or class information of the L dimensional images, based on where they map in their respective coordinate systems. In a further embodiment, determining if the azimuthal angles and/or the additional Euler angles are correct comprises checking to see if the azimuthal angles and/or the additional Euler angles are tightly constrained. The invention is not limited to these embodiments, and those experience in the art will see that multiple additional embodiments are possible.

2 Additional Information on Materials and Methods 2.1 AQP0 Data Sets

AQP0 belongs to one often mammalian families of highly conserved, water selective, membrane channel proteins. Each monomer of aquaporins is thought to be wedged tightly within the tetramers, and to possess an independent water pore, 6 tilted (18 30°), membrane spanning a helices that form a barrel, and 5 polypeptide loops (A-E) that connect the helices. Two of these loops (B=cytoplasmic, and E=extracellular) are conserved throughout the aquaporin superfamily. Each contains the aquaporin signature motif, namely, asparagine proline alanine (NPA). Loops B and E are partially helically coiled and fold into the bilayer from opposite sides to form key elements of the pore wall. These infolding loops are thought to be essential for maintaining the connectivity of water flow in the narrow pore channel.

Most such channels have been studied by x-ray and electron crystallography, but AQP0 has not yet been crystallized. Each monomer contains a curvilinear pore pathway, consisting of three domains: external and cytoplasmic portions that flare out into vestibules about 15 Å wide; and a constricted region lying between them, the latter consists of a narrow, 20 Å long selectivity filter, only 2.8-3.0 Å in diameter at its narrowest point, which is only one amino acid residue long. The unusual combination of a long, narrow channel lined with hydrophobic residues, with only a few solute binding sites, facilitates rapid water permeation, with a minimal energy barrier, but prevents transfer of most other small molecules and ions. These unusual features owe largely to a rich potential for interactions between different domains and subdomains of the continuous polypeptide chains—each containing a helices, connecting loops, hundreds of side chain residues, and amino and carboxylic termini that extend from the cytoplasmic side (Cheng et al., 1997; Murata et al, 2000; Sui et al., 2001; Németh Cahalan et al., 2004).

We used a data set of 3361 AQP 0 (AQP0) images generated as described in Zampighi et al. (2003). Purified AQP0 was reconstituted in liposomes, which were freeze fractured, multi axis shadowed with platinum and carbon, and imaged at 0° and 50° using RCT (Radermacher, et al., 1987). These freezing, fracturing, and shadowing techniques lead to high retention of native conformation (Morris et al., 1994). By attaching large liposomes (~2 µm diameter) to glass before fracturing, the local curvature of the lipid bilayers was flattened, thereby effectively eliminating two of the three Euler (azimuthal) angles as free variables. An innovative pulse-shadowing protocol significantly increased replica stability (Zampighi et al., 2003) and, may have limited platinum grain growth.

By employing this protocol, consisting of two 4-sec exposures, spaced 2-3 sec apart, the platinum grain diameter may have been reduced. The 2-3-sec "cooling" interpulse also may have led to reduced kinetic energy/mobility of surficial platinum atoms. This would lead to smaller grain sizes, kinetics of dewetting being constrained by atomic mobility (Woodward and Zasadzinski, 1996). Apparent smaller grain size, and deeper penetration, on pulsing, also increase replica mechanical stability (Zampighi et al., 2003). Inasmuch as migration of shadowed platinum atoms is precluded (Woodward and Zasadzinski, 1996), it is evident from the replicas obtained (FIGS. 8-11, 14), particularly views of their convex and concave sides (FIG. 14), that extensive platinum penetration of the samples occurred.

2.2 Pre-Processing of AQP0 Data Sets

Low pass filtering, density inversion, application of a circular mask, and translational alignment, for both tilted and untilted images, as well as imposition of C4 symmetry on the untilted images, were performed with the Imagic-5 software package (van Heel et al., 1996). All subsequent processing of untilted images used the SORFA neuronal networks described below. Care must be taken not to mask the images too tightly, otherwise artifacts may result that may interfere with proper alignment. Untilted images were filtered to 24 Å for the alignment and classification stages of SORFA.

2.3 Construction of SORFA

SORFA is a Kohonen SOM [or any other SOM that consists of 1 or higher dimensional arrays of artificial neurons (continuous or discrete), codebook vectors, or tensors, all of which morph toward, or approach a condition of similarity to, the training images, in a way that attempts to preserve the topology of the data set, like, for example, fuzzy Kohonen clustering networks (FKCN) (Pascual et al., 2000), KerDenSOMs (Pascual Montano et al., 2001), and Parameterized Self-organizing Maps (PSOM), where continuous mappings may be attained (Walter and Ritter, 1996) that can switch between any number of different topologies and metrics in a serial and/or parallel fashion, with the results of one SOM being the input for the next. The application of cylindrical and N dimensional hypercubical topologies, in particular, will be the focus of this paper, because they match the topological characteristics of the data used here. A mathematical account of the operation of the Kohonen SOM may be found in Zampighi et al. (2004).

Figure 2:
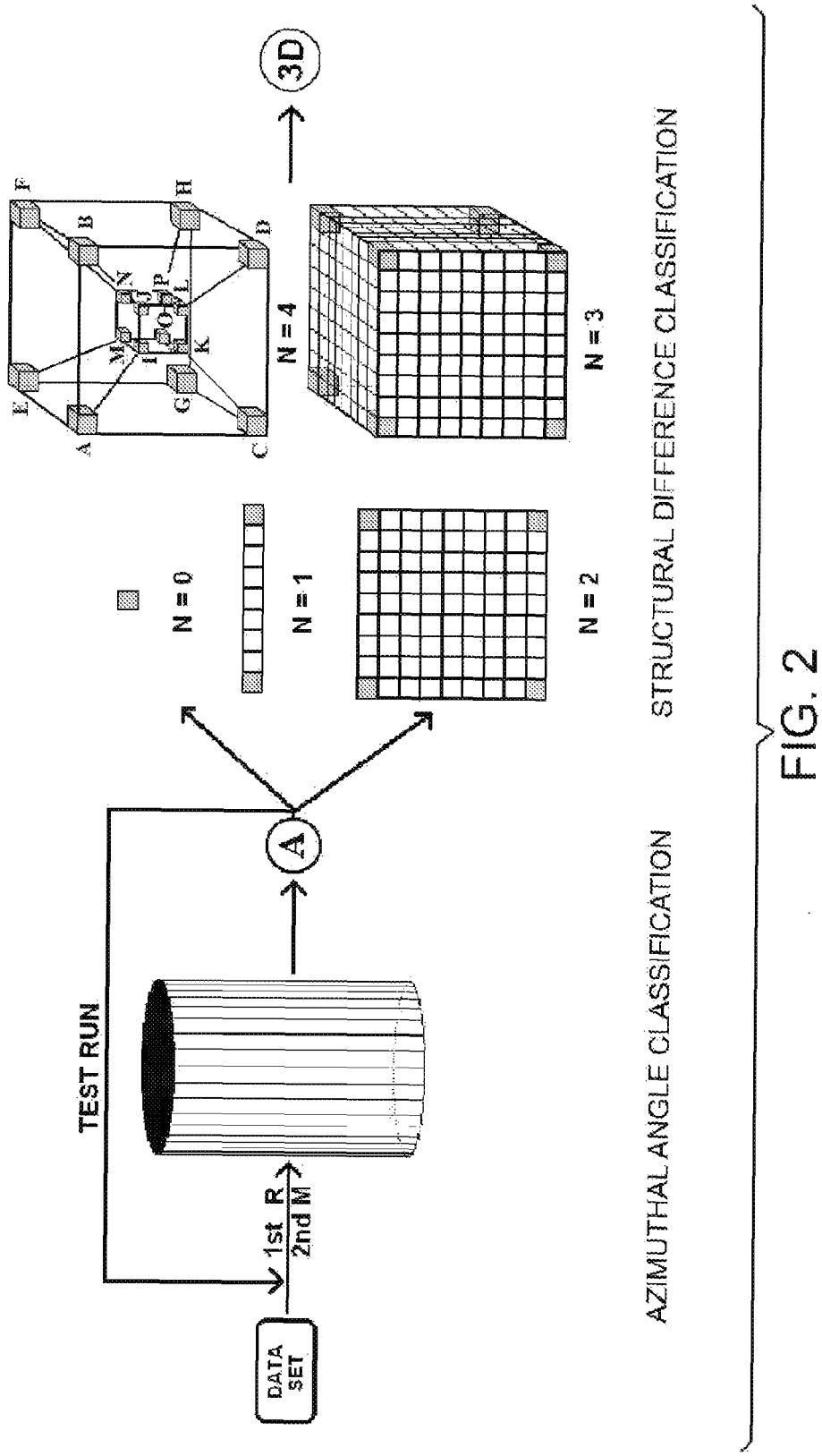
FIG. 2 illustrates a schematic diagram of a reference-free method for aligning and classifying single-particles, according to one embodiment of the invention.

In constructing the cylindrical topology, we wrapped the planar grid SOM around itself and seamlessly attached opposite edges to form a cylindrical array of artificial neurons (see FIG. 2). When using the cylindrical topology, training proceeds by singly presenting randomly rotated images (the untilted 2D EMs), in a random order, from the data set to the network, and allowing gradual adaptation of the grid images. Letter R in FIG. 2 symbolizes this operation. Rotation is performed by an anti-aliasing rotator.

Because translational alignment of the untilted images has already been carried out, all rotation is done around image centers. Results are displayed on the cylindrical grid, after "training" the network, by mapping the original unrotated images making up the data set onto the surface of the cylindrical grid (letter M in FIG. 2). Azimuths of the data set images then are read directly from the azimuthal axis of the output cylinder. Distances are calculated only along the cylinder's surface (for details see Example 1). After the azimuths of the data set images are read from the azimuthal axis of the output cylinder, they are applied to the images, thereby producing the required rotational alignment. The topology of the network is then switched to an ND cubical array, to allow operator control on the number of vertex classes generated, and the degree of vertex class homogeneity. No random rotation of the images is needed during training at this step. Examples of ND arrays for values of N from 0 to 4 are shown in FIG. 2. For these arrays, simple Euclidean distances are used when calculating distances in neuron space. These features were implemented in XMIPP (Marabini, et al., 1996) and in the SOMULATOR, an artificial neural network that we developed to run on Microsoft Windows based platforms.

2.4 Operation of SORFA 2.4.1 Azimuthal Angle Classification

The following steps are used to determine the relative azimuthal angles of the untilted input images, as schematically represented in FIG. 2. SORFA starts with a cylindrical topology, one that is naturally suited to classifying azimuthal angles when the other two Euler angles are tightly constrained:

The operator switches the topology of SORFA to cylindrical, and inputs 3 starting values: one known (output grid resolution=cylinder circumference), and two that must be adjusted (learning rate, and cylinder circumference/height ratio), in order to limit the error (a value obtained from the test run in step 6) to a level acceptable to the operator. The number of training cycles for the final run is usually fixed at ~300,000, [Note: if the sampling rate of the camera exceeds, 1/3.1 Å, then larger numbers of iterations may be needed to achieve the best results] and the initial learning radius is automatically set to the circumference of the cylinder, though this requirement is not rigid. A shortcut is to work, first, with smaller grids, until ideal conditions are found, then to scale up to the desired circumference, keeping the circumference/height ratio approximately constant.

Note: The cylindrical topology may correspond to a regular or irregular cylinder or hypercylinder, or any other volume or hypervolume with a cylindrical topology. All the demonstrations in this paper employ a regular cylinder. An irregular cylinder is a frustum of the surface of a cone. Such a frustum may be formed from the surface of a cone with a circular base by cutting off the tip of the cone, forming a lower base and an upper base. In the case that the upper and lower bases are circular and parallel, and mutually perpendicular to the height, then three variables uniquely specify this irregular cylinder: the circumference of the two bases, and the distance separating them.

The operator inputs the 2D images (or any ND entities representable as vectors or tensors) into SORFA and starts training the network. Runs typically last a few minutes to a few hours on a 1.33 GHZ AMD/MP 1500+ dual processor (processing time proportional to number of training cycles entered.

In order to properly calibrate the azimuthal axis, overall symmetry of the data set must be determined. Inspection of output "A" (output A) reveals by how many degrees the grid images rotate through one revolution around the cylinder dividing this value into 360° yields the symmetry fold. One may use the XMIPP or the SOMULATOR display window to scroll the images across the screen around the direction of the cylinder's circumference (the horizontal direction): this procedure plays a movie of the images around the circumference, working very well with noisy data sets to determine the direction and amount of their rotation.

Output "B" (output B) displays a list of relative azimuths of input images along one of two mutually perpendicular axes on the surface of the cylinder of artificial neurons (the circumferential axis) by noting the azimuthal axis coordinate of each image.

2.4.2 Test Run

Input images are brought into rotational alignment by applying the azimuthal angle values displayed in output B to the data set images, by way of an anti-aliasing rotator. The above steps are repeated using the aligned images as the training set, and the same starting values (learning rate and cylinder circumference/height ratio).

The new output B gives the standard deviation of the distribution of azimuths. If this deviation is within an acceptable range for the desired angular resolution, one proceeds. Otherwise one returns to the beginning, but with modified starting values.

2.4.3 Structural Difference Classification

To obtain $2^N$ vertex classes of the data set (representing $2^N$ different conformations, functional states, or views of the imaged macromolecule), the operator switches over to an ND hypercubical topology, or a multidimensional rectangular grid topology. These topologies appear to be naturally suited for classifying structural differences [Note: at this point, to generate classes, it is possible to use other classification schemes, such as MSA, if one prefers]. The network is trained with the aligned images for a number of cycles equal to from ~(100-1000) times the number of images in the data set, at an initial learning rate of 0.1.

~(150-200) images are harvested from each of the $2^N$ vertex classes, also called the principal classes. Non-principal classes may also be harvested from one or more neighborhoods in the ND hypercubical space, each neighborhood representing a homogeneous class. Faster camera sampling rates (>1/3.1 Å), and improvement in other factors required for better resolution including, but not limited to, decreased spherical aberration (<2×106 nm), decreased electron wavelength (<0.00335087 nm), reduced defocus maxima [<(200-300) nm], etc., may require larger numbers of images to be harvested in order to achieve the best resolution results. After training SORFA using the ND hypercubical topology and selecting principal and/or non-principal classes, the operator has the choice to proceed directly to the 3 Ds in step 10, and/or refine (or recalculate) the azimuthal angles by executing step 9 (hyperalignment, see Example 5) before proceeding to the 3 Ds.

For a discussion on locating the vertices of the hypercube, see Example 1. If only two classes are desired, they may be gleaned directly from the cylinder. ~(150-200) untilted input images that are mapped to the top most rows of the cylinder are used to create a 3D reconstruction, representing one conformation of one domain of the imaged protein. ~(150-200) more images are gathered from the bottom most rows and are used to make a second 3D reconstruction representing another conformation of the same or different domain. When gathering images, take the images from the top most or bottom most row and then add additional rows until ~(150-200) are obtained.

2.4.4 Hyperalignment (Optional) (Also see Example 5)

The selected principal and/or non-principal classes produced from steps 7 8 are each used as a set of input images for independent runs thorough steps I to 5 (Note: as a matter of practice, it is better to assemble the class member images from the original images, because compounded rotations of a single image, using a rotator with even a small amount of aliasing error, will introduce progressive errors). Each time step 5 is completed, the new output B gives the standard deviation of the distribution of azimuths. If this deviation is within an acceptable range for the desired angular resolution, one proceeds to the 3D's in step 10. Otherwise, one repeats this step, but with modified starting values (learning rate, and cylinder circumference/height ratio).

2.5 Setting Parameters for Azimuthal Angle Classification

To obtain the best alignment of a data set, only two parameters must be determined by trial and error: first, the cylinder's circumference to height ratio, and second, the initial learning rate. All other parameters are fairly well defined.

2.5.1 Trial and Error Parameters

Initial learning rate. SORFA normally requires lower learning rates with data sets of greater heterogeneity. For tests with EM images, for example, we found that learning rates should be set to values of 0.001 or lower. For less heterogeneous, artificially generated, data sets, a value of 0.01 is sufficient. For a discussion of the effect of the initial learning rate, see Example 2.

(b) Circumference to height ratio. Empirically, it appears that the greater the heterogeneity of the data set, the smaller the needed cylinder circumference/height ratio, other variables being held constant. Circumference/height ratios often work well over wide ranges. For example, the 3,361 image AQPO data set produced the lowest standard deviation test runs with circumference/height ratios in a range from 0.82 to 1.22 and beyond (for the hyperalignment of ~(167-182) image subsets, we used circumference/height ratio of 20.0). To determine an optimal circumference/height ratio, it saves time to start with a very small circumference (the serial computing time is proportional to the surface area of the grid). Once the best test run is found for the small grid, one can then scale up to the desired larger circumference, keeping the circumference/height ratio constant, and using the same number of iterations and learning rate.

2.5.2 Well Defined Parameters

Cylinder circumference. The cylinder circumference is set to whatever angular resolution the operator hopes to achieve (realizing that angular resolution is fundamentally limited by, among other things, noise and the sampling rate of the EM images). For example, if one wants the azimuthal axis to be calibrated in 6° increments, one uses a cylinder circumference of $\{360° \text{ I } [(\text{symmetry}) \times (6°)]\} = 360°/(4 \times 6°) = 15$ neurons.

(b) Initial learning radius (initial Gaussian curve standard deviation). This is set to the largest dimension of the cylinder (usually the circumference), though a wide range of values typically work.

2.6 Initial Grid Images

It is important that the initial pixel values of the grid images are randomized. Operators of Kohonen SOMs typically use a shortcut, however; the initial grid images are chosen from the training set, itself, to reduce the number of iterations necessary for output grid image convergence. In one embodiment, this shortcut is not be used with SORFA using a cylindrical topology, because it prevents the global alignment of heterogeneous populations, by introducing a small rotation of the images along the height axis, when all rotations should be confined to the azimuthal axis.

2.7 Random Rotation

Randomly rotating the data set images (Operation "R" in FIG. 2) during cylinder training serves important functions. First, it minimizes the influences of any preferential orientations that might exist in the data set. Because of the SOM's metric preserving characteristics, such orientations would bias the network, and introduce non linearity in the calibration of the cylinder's azimuthal axis. In other words, a non uniform presentation of angles results in a non uniform azimuthal axis calibration, because of the SOM's attempt to conserve the metric. Therefore, randomly rotating the images during training is a means of linearly calibrating rotational variation around the cylinder, that is, a means of linearly calibrating the azimuthal axis in the cylindrical coordinate system of the output grid. Calibration of the azimuthal axis can be made arbitrarily linear, given a sufficient number of randomly rotated presentations of training images (Example 3).

In addition to linearly calibrating the azimuthal axis, random rotation helps to ensure the very existence of an azimuthal axis. It ensures sufficient angular variation in the training set to guarantee that the network will map azimuths along one of the principal network axes (for the cylindrical topology, the azimuthal axis wraps around the cylinder). Because the network attempts to preserve the metric of the data, a larger amount of angular variation (more randomly presented images) leads to a guaranteed mapping domain around the cylinder.

2.8 Training Cycles

For final alignment runs, we seek a smooth distribution of orientations of the presented images during training. This is done in order to linearly calibrate the azimuthal axis. To achieve this, we recommend a number of training cycles in the range of ~100,000 to ~300,000 [Note: camera sampling rates greater than 1/3.1 Å may require larger numbers of training cycles for best results]. Trial and error shows that this range works best (theoretically justified in Example 3). When searching for the best cylinder height and initial learning rate, one can use a lower number of iterations (to save time) and then scale up to 300,000 for the final alignment run.

2.9 Evaluating Parameters for Azimuthal Angle Classification

We found that a narrow width {the low standard deviation) of the histogram of the test run is the litmus test for evaluating azimuthal angular alignment. We generated the histogram by plotting the number of mappings to a given column of the cylinder versus the column location. Whenever one gets a narrow test run, the azimuths {obtained in output B) yield an alignment that is plainly evident upon visual inspection {see "aligned training set" examples in FIGS. 3, 4, and 6), as well as upon comparing the azimuths with their known values {when known).

The test run is the reprocessing of aligned images using the same cylinder conditions, in order to determine the consistency of the determined azimuthal angles between runs (steps 1 4). In the test run, the greater the deviation of the mapped image angles from the mean (measuring along the circumferential-axis from the cylinder column where most of the images have mapped), the greater the relative angle deviation between corresponding images of the two runs. Therefore, one seeks the narrowest vertical band of images, stretching from top to bottom of the test cylinder. This may be expressed quantitatively as the standard deviation of the angle distribution in output B of the test run.

2.10 Setting and Evaluating Parameters for Structural Difference Classification

The dimension of the hypercube (or hyper parallelepiped) is set to N for the network to return $2^N$ vertex classes from the $2^N$ hypergrid vertices (FIG. 2). Also, the number of training cycles should be set to ~3 times, or more, the number of training images. We found it is preferable to use a number of training cycles of ~100-1000 times the number of training images. Better class homogeneity was obtained with higher values. The learning radius is set to the length of the hypercube. The learning rate may be set to 0.1 initially.

Evaluating the quality of the structural difference classification is not as straightforward as evaluating the alignment, because, with Kohonen SOMs, there is no single variable that measures overall quality of maps (Erwin et al., 1992; Kohonen, 2001). Two output variables may be considered: 1) the quantization error; and 2) the runner up, winning image distance (Kohonen, 2001). The quantization error gives an overall measure of how well grid images in output resemble the training set smaller values being better. The runner up, winning image distance is a measure of how well the topology of the data has been preserved on the map. Here too, smaller values are more desirable.

2.11 Preparation of Test Sets Using the AQP 1 X-Ray Model

We took the Aquaporin 1 (AQPI) x-ray model (Sui et al., 2001) and split it in half Each half was then reprojected to obtain the extracellular and cytoplasmic domains viewed head on. These two images were used to construct a test set for azimuthal classification, by randomly rotating their contents through all angles and adding Gaussian white noise using Imagic 5.

A second test set was created to assess structural differences. The two x-ray AQPI projections (just described) were concatenated to 6 more images, which had been generated by imposing different symmetries, ranging from 3 to 6 fold, on the x-ray AQP1 projections. We call these 8 test images generator images, because each was then used to generate a class of test images, as follows: the 8 generator images were modified by adding Gaussian white noise and introducing a limited random rotation ($5° \leq \theta \leq 5°$). The SNRs of the test images were calculated, as follows: first, the variance of the signal (before adding noise) was normalized using the Imagic 5 Norm Variance utility; noise of a specified variance was then added using the same utility. The ratio of the variance of the signal to the variance of the noise is defined to be the SNR (Frank, 1996).

2.12 Three Dimensional Reconstruction Using Azimuthal Angles and Classes Obtained from SORFA The orientation of a particle in 3 space is completely specified by three independent variables. For replicas of proteins embedded in phospholipid bilayers imaged using RCT (with a fixed 50° tilt angle) and glass as a flat adhesion surface for the liposomes during freeze-fracture, two variables are tightly constrained, and effectively eliminated as free variables. Therefore, only one unknown of particle orientation is needed to calculate 3D reconstructions: the relative rotational orientation in the bilayer plane (azimuth). Homogeneous domains can be determined by partitioning the 2D data into homogenous classes. If done properly, images representing the cytoplasmic and extracellular domains of the protein should cluster into different partitions. The alignment and classification operations were performed by SORFA. After obtaining the Euler angles, tilted images were rotated to bring the tilt axis into coincidence with the Y axis. The 3D reconstructions were computed by employing the weighted back projection algorithm (Radermacher et al., 1987; Radermacher, 1988), and a Fourier method, rooted in the discrete Radon transform (Lanzavecchia et al., 1999).

Euler angles were refined by comparing each tilted image with projections obtained from the 3D reconstruction. These comparisons allowed the assignment of new angles to the images, based on the closest match with the projections. This refinement, which hinges on the projection matching strategy of Harauz and Ottensmeyer (1984), was repeated several times until convergence. Imprints of the concave surfaces were calculated as described by Zampighi et al. (2003). 3D reconstructions were displayed with the AVS package (Advanced Visualization System, Inc.) at levels of isosurfacing chosen to obtain a thickness of the replica (10.5 15.5 Å) consistent with the 13($\pm$2) Å thickness of the platinum-carbon replica (Eskandari et al., 1998, 2000).

3. Results

One of our principal goals was to develop a reference free method of aligning and classifying images with different orientations in the plane. Below, we describe examples using artificially created data sets, and then AQP0 EM images.

3.1 Tests Using Artificially Generated Images 3.1.1 Azimuthal Angle Classification We generated a synthetic population of 1,200 solid white squares of 6 different sizes, and random, in plane, angular orientations (FIG. 3, top), and used it to train the network. First, randomizing all grid pixel values initialized the network's output grid images. For illustration, the surface of the cylinder is shown as a large square rectangle (starting conditions in FIG. 3), cut along the height, from top to bottom, and laid flat (circumference, horizontal; height, vertical). Remember that the left and right borders of this rectangular representation are attached to one another in the neural network. The first training image ("a") was randomly selected, randomly rotated (importance of which explained below), and presented to the network, with the output grid being modified (trained) by this image. Then, another training image ("b") was randomly rotated and presented; the output grid was modified again, etc. As will be seen below, the particular order is irrelevant because the alignment results become order independent when the learning rate drops below threshold.

Training was continued for 30,000 cycles. For every cycle of image presentation, all the grid images were made to morph slightly toward that of the presented image. For that reason, even though initialized in a random pixel state, the observed final grid images (output A) finally resembled the input squares. However, the amount of morphing of output grid images was not the same everywhere. It decreases as one moves away from the "winning image," defined as the grid image that most closely resembles the presented image {grid image with lowest Euclidean distance to presented image, with the images represented as vectors). This decrease is made to follow a Gaussian distribution. We decreased the standard deviation of this distribution in successive training cycles. The level of morphing was also made to decrease (linearly) as the network training progressed, in order to fine tune the results (set by LO=0.1; this higher value for the learning rate works well with synthetic data sets because there is less heterogeneity). These conditions allow the grid to become ordered: first globally, then locally, as is evident when observing the following in FIG. 3:

1) Moving horizontally across output A, from any starting position, the sizes of the white square images remain constant, but the angular orientations rotate uniformly.

2) Moving vertically across output A, from any starting position, the converse is true: the image sizes increase or decrease uniformly, but the angular orientations remain constant.

Therefore, the network separated angular variation and size variation along orthogonal directions of output A. From the above observations we concluded that, because of the local and global ordering of output A images—regarded as bins, with sorting of the training set images into bins of greatest resemblance—the data set gets classified according to both size and angular orientation. The vertical position indicates relative size, and the horizontal position, relative angular orientation. We performed the mapping by using, as a similarity criterion, the Euclidean distance between the vectors that the images represent; the shorter the distance between vectors, the greater the corresponding similarity.

Output B shows the average contents of each bin, after the mapping. Each of the 6 size classes is observed to fall into a distinct horizontal row of images. The largest and smallest sizes, representing the endpoints of the data set's principal bounded variation (size), were mapped to the upper and bottom most portions of the cylindrical grid (because the cylinder's top and bottom are its topological boundaries). The relative angular orientations of the images mapped to each column are indicated by the azimuthal angle axis at the bottom of output B. Because the test image shapes (mapped to the output grid "bins") rotate uniformly around the circumference of the cylinder, the axis is calibrated in 90°/15=6° increments. That is, images mapped to the first column of the cylinder (the left most column, defined as column 1) have relative angles of 0°. Images mapped to the second column have relative angles of 6°, and so on, down to the last column where the mapped images have relative angles of 84°.

We compared the known azimuths of the test images to the angles obtained from output B, determining that angle assignments were correct to within 6°. We obtained proportionately greater accuracy in rotational alignment, by increasing the circumference of the cylinder. For example, on a run with a circumference of 90 neurons, the azimuths for the test images calculated using SORFA did not deviate more than 1° from their known values. The only limiting physical factor in resolving the azimuths appears to be the number of pixels in the test images, themselves.

To summarize, we started with a randomly oriented, heterogeneous mixture of square images. Using SORFA, with a cylindrical topology, we correctly determined the azimuths of all 1,200 images. In addition, SORFA correctly classified the 6 square sizes in the training set into 6 distinct rows.

3.1.2 Evaluation of Azimuthal Angle Classification

The following ""test run" determined the consistency of the azimuths. First, we rotationally aligned the test set, by applying the relative azimuth for each test image, and then used this aligned test set to train the network, just as above. After training, the mapped images fell into two adjacent columns (test run in FIG. 3). This was an optimal result. This follows because, for example, if images from 0° to 6° are mapped to column one and images from 6° to 12° are mapped to column two, then two closely aligned images at 5.9° and 6.1°, respectively, would be mapped to separate columns, even though the separation is only 0.2°. The probability of this, or the equivalent, occurring in a field of thousands of images, is almost a certainty. Therefore, mapping of all test run images to a single column is highly unlikely.

Consistent results also were obtained with other test image symmetries, when applying azimuthal angle classification (for example, rectangular, triangular, pentagonal, hexagonal, heptagonal, and octagonal test sets; data not shown). A general rule emerged from these experiments: the test images rotate around the cylinder by (360°/image symmetry). For example, hexagons, with 6 fold symmetry, rotate by (360°/6)=60° around the circumferential axis of the grid. This is expected, because a rotation of 60° brings a hexagon back to its original orientation, with the variation being unbounded, representing a full turn around the cylinder. Therefore, for test images of n fold symmetry we labeled the azimuthal axis of the cylinder in [(360°/n)/(circumference)] degree increments from column to column. Conversely, the symmetry of the data set may be empirically determined by dividing the number of degrees of rotation of the grid images around one full turn of the cylinder into 360°.

3.1.3 Influences of Noise on Azimuthal Angle Classification.

We added various noise levels to the synthetic squares described above and performed azimuthal angle classification. When we used the same starting parameters described above, no effect on the precision or accuracy of the azimuthal angle determination was observed for noise levels yielding SNRs as low as 0.07; with higher noise levels, we could still obtain good alignment by changing the starting parameters.

Figure 4:
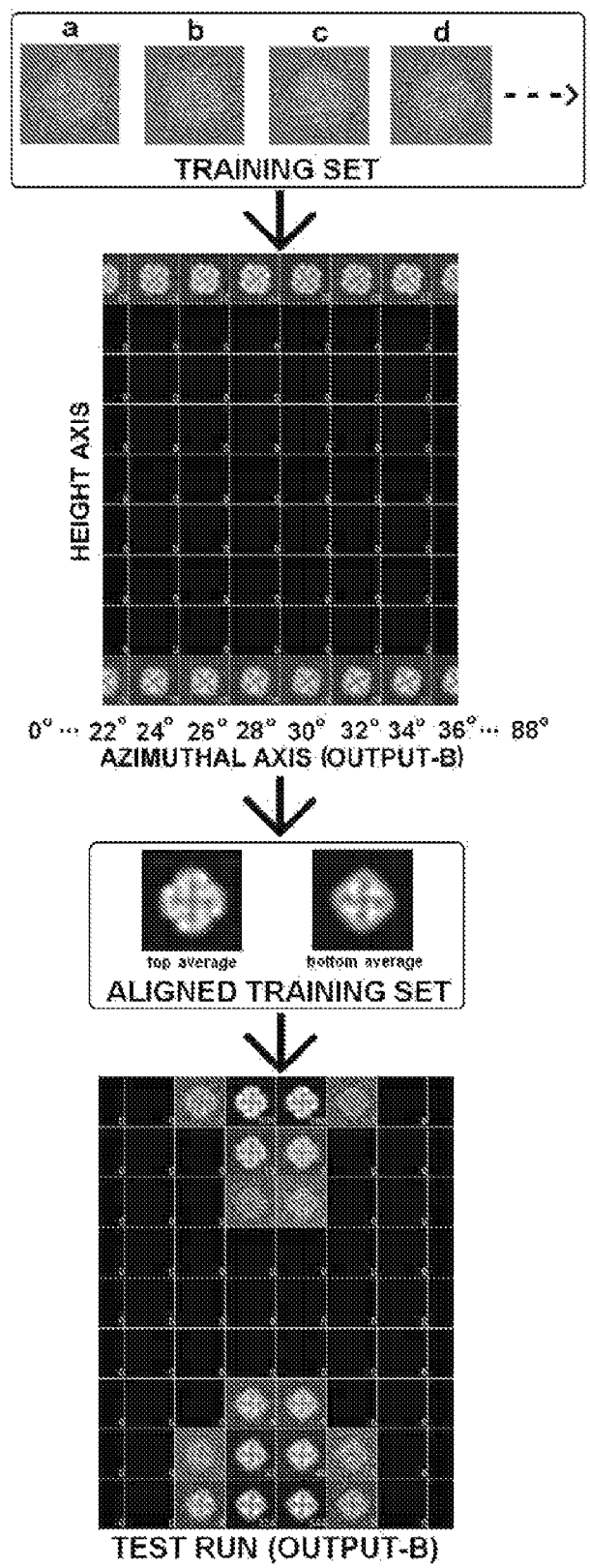
FIG. 4 illustrates azimuthal angle classification and alignment of the AQPI test set, according to one embodiment of the invention.

We next applied SORFA to a more realistic test set of randomly rotated projections of the atomic model of AQP1 (Sui et al., 2001), with noise added (top of FIG. 4). The model was split down the middle to generate projections that represented the cytoplasmic and extracellular domains as viewed head on. We added varying levels of noise, and generated 1,200 randomly rotated representatives for each of the two sides. These images were then used as a test set to train SORFA, with a cylindrical topology, for 5,000 cycles at an initial learning rate of 0.1.

As is evident in output B of FIG. 4, the two projected sides were perfectly separated around the cylinder's top and bottom. After bringing the images into alignment using the output B azimuths, the respective averages (aligned training set averages in FIG. 4) were indistinguishable from the original images, before adding noise. The mapped images in the test run were nearly completely confined to two columns (test run in FIG. 4). Note that the numbers in the lower-right hand corners indicate the number of images mapped to, and averaged, in each bin. When adding noise down to an SNR of 0.25, the bandwidth of the test run did not increase. Because the untilted AQPO images have an SNR of ~1, we ignored the effects of noise in the analysis of this data set.

3.1.4 Structural Difference Classification Using the Cylinder

In the above experiment, the cylinder perfectly separated the two domains of the AQP 1 x-ray model, with noise added down to a SNR of 0.25. After obtaining perfect separations using a wide variety of noisy test images, ranging from human faces to electron micrographs, we concluded that the cylinder is inherently robust at classifying a noisy training set consisting of only two noisy classes. As the number of noisy classes increases beyond two, however, the cylinder's ability to produce homogeneous classes rapidly deteriorates. Therefore, when there are more than two noisy classes comprising the training set, an alternate method should be used. We experimented with the N-CUBE as a possible tool for such classifications.

3.1.5 Structural Difference Classification Using the N-CUBE

We performed N-CUBE SOM tests for values of N=0, 1, 2, 3, and 4 to evaluate the network's ability to handle up to 8 test classes. Each class consisted of a variable number of elements, each a different modification of a single image: the "'generator image." The modifications only altered orientation and clarity, not structure. We modified the images by, both introducing a limited random rotation ($5° \leq \theta \leq 5°$, and adding Gaussian white noise. Two of the 8 generator images are the cytoplasmic and extracellular projections of the x-ray AQPI model. The other 6 were formed by imposing various symmetries (3 fold to 6 fold) on the first two.

Figure 5:
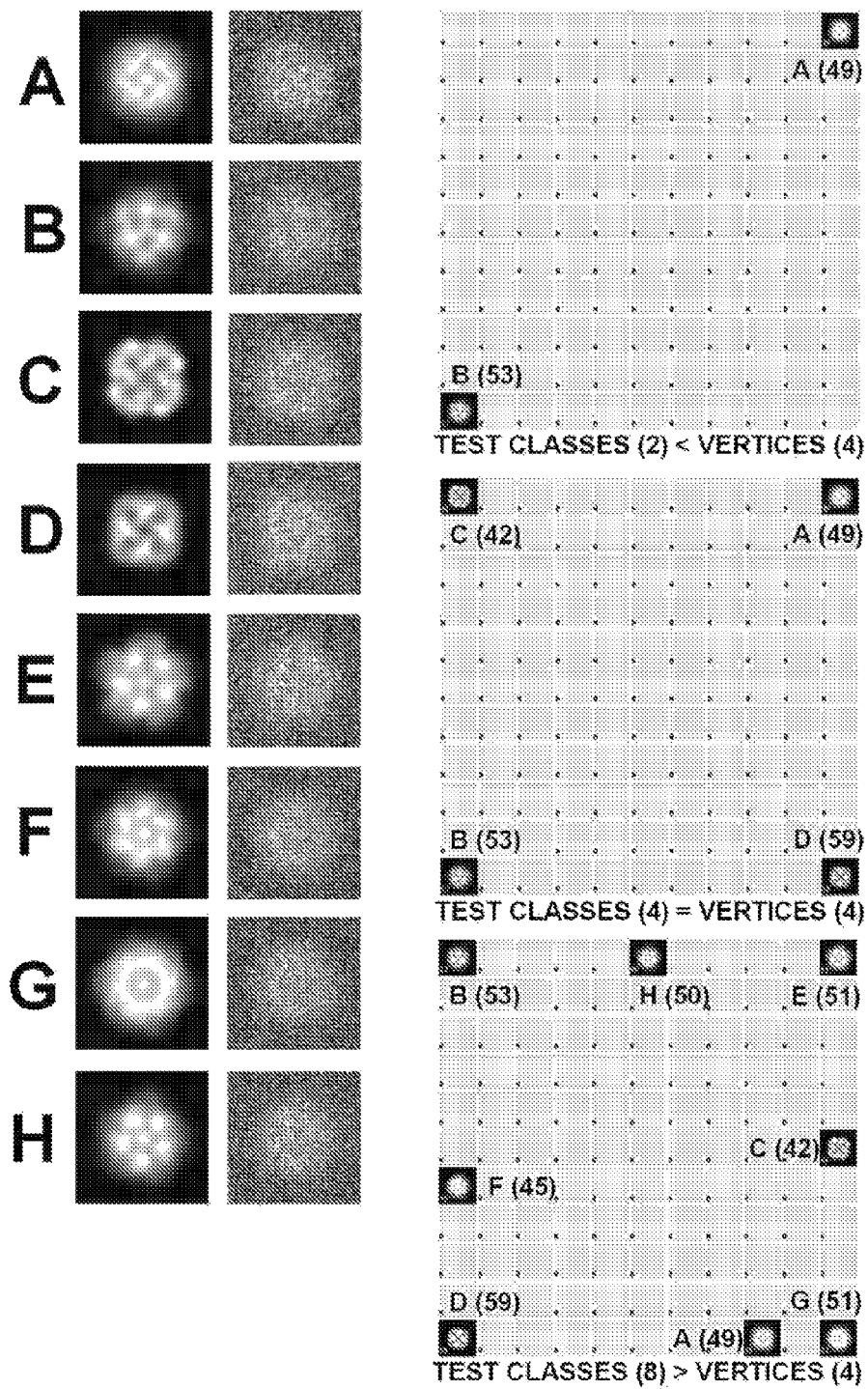
FIG. 5 illustrates the effect of mapping variable numbers of test classes for N=2, according to one embodiment of the invention.

The purpose of introducing noise and limited random rotation is to try to make structural classification more difficult through variations that do not alter class membership, only spatial orientation and clarity. FIG. 5 shows the generator images of the eight classes in the left column, and one example from each of the corresponding noisy, rotated, test classes in the right column. The ($5° \leq \theta \leq 5°$) random rotational variation made the image alignments more comparable to those of a noisy EM data set. Our choice of applied random variations was based on our observation that the x-ray AQPI test set, was easier to align than the actual AQP0 micrographs. For example, the 4S neuron circumference cylinder aligned 99% of the AQPI test images to within $\pm I 0$ (see above), whereas 82.7% of the AQPO images were to within only $\pm 2.0°$ (see below).

We also trained the N-CUBE SOM for N=0, 1, 2, 3, 4, using combinations of 1 to 8 test classes, with class membership size varying from 1 to 100, with varying amounts of noise. We first carried out tests without noise or rotation. In nearly every instance, the following two cases describe the behavior of the test classes near the vertices. This behavior helps the operator to locate homogeneous subsets of the principal (largest) test classes by looking at the images mapped to near, or at, the vertices.

CASE 1: The number of test classes is ≤than the number of vertices: each and every member of the same test classes maps to the same vertices (or a position within their immediate neighborhood). For example, the top-right panel of FIG. 5 shows output B when two test classes, A and B, are analyzed in a 2-CUBE SOM (four vertices). Class A (49 members) and class B (53 members) map to diametrically opposite vertices. When the data set contains only two classes, they nearly always map to diametrically opposite vertices. The middle-right panel of FIG. 5 shows what happens when two additional test classes are present, making a total of four. Class C (42 members) and class D (59 members) map to vertices, as well as class A (49 members) and class B (S3 members).

CASE 2: The number of test classes is >than the number of vertices: only the test classes with largest memberships map to the vertices (the principal classes). The bottom-right of FIG. 5 shows the case when a data set, which contains 8 test classes, is analyzed in a 2-CUBE SOM (4 vertices). Only the 4 largest test classes map to the 4 vertices: Class D (59 members), class B (53 members), class E (51 members), and class G (51 members). The 4 smaller test classes map to unpredictable positions along the edges. Therefore, in order to position a maximum of $2^N$ principal test classes around the vertices, an N-CUBE SOM should be used. Each shape can.be thought of as an endpoint of a variation whose boundaries are the shapes themselves. The principal shapes may map to the vertices because they seek the largest mapping domain.

As noise is gradually added, and the limited random rotation is introduced, a fraction of the mapped images begin to drift away from the vertices. This probably is because the significant variation introduced by noise breaks down the well defined boundaries between classes. Eventually, with enough noise added, the vertex classes become contaminated with members from other test classes. The effect of increasing N on vertex class homogeneity is shown in FIG. 1 G, revealing that vertex class homogeneity progressively improves as N increases from 0 to 4, and possibly beyond. For example, when N=4 and the SNR=0.32, the vertex classes are still perfectly homogeneous.

3.2 Analysis of AQPO Images

With the understanding that relative azimuthal angles may be read off of the circumferential axis of the cylinder, and that principal classes may be read off of vertices of the N-CUBE, we progressed to classifying untilted AQP0 images according to their azimuthal angles and principal structural differences.

3.2.1 Azimuthal Angle Classification of Symmetrized AQP0

3,361 untilted images of freeze fractured AQP0 particles were used. This data set consists of views of the cytoplasmic and/or extracellular faces, and in varying conformations. Symmetry was imposed to attenuate any image heterogeneities caused by metal layers of variable thickness deposited on the fracture faces, and to improve alignment [also see Boonstra et al., (1994)]. This use of C4 symmetry was based on the analysis of Eigen images described by Zampighi et al. (2003).

A cylinder of 45 grid image circumference, was used to calibrate the azimuthal axis in 90°/45=2° increments. The network was trained for 300,000 cycles with a learning rate of 0.001. Output B is displayed in FIG. 6. The final grid images in output A (not shown) were nearly indistinguishable from the average of the aligned images. As with the test images, we observed that the angular orientations of the grid images uniformly cycled around the cylindrical grid. The images mapped with the smallest images at the top, and progressed to the largest images at the bottom.

Relative azimuths of all 3,361 images were read from output B, by noting to which cylinder column bins the images were mapped. Next, a test run on the precision of the azimuths, gave the results shown at the bottom of FIG. 6. Here, 82.74% of the images fall into two columns. Therefore, 82.74% of the images were precise to within 2 4° for the two SORFA runs (bottom of FIG. 6).

We repeated the alignment procedure with a higher learning rate of 0.0025, to ascertain its effect on the quality of the test run. With this higher learning rate, 65.40% of the images were precise to within 2 4°. Thus, the lower learning rate produced better alignment. This probably ensues because of the large amount of heterogeneity of the data set. A lower learning rate weakens the influence of training images during training, thereby reducing any bias from the early part of training A learning rate lower than ~0.001, however, had no effect on the standard deviation of the test runs, even with increased numbers of iterations out to 3 million (up to a ten-fold increase). Reduced learning rates also had no effect on the precision of the azimuthal angles obtained between independent SORFA runs. Therefore, it was not necessary to go below a learning rate of 0.001 because the threshold had been reached where a reduced influence of the training images had no effect in improving alignment. A second run at the 0.0025 learning rate allowed a comparison of the azimuths between the runs, to ascertain angular reproducibility between the two 0.0025 learning rate runs. We arbitrarily selected particle #124 as a 0° reference. The average angular deviation of corresponding images between the two runs was only ±2.47°, close to the value predicted from the test run. The alignment results were, therefore, essentially independent of the order of the images used during training.

3.2.2 Structural Difference Classification and 3D Reconstruction of Symmetrized AQP0

After azimuthal variation had been largely eliminated from the AQP0 data set by applying the cylindrical topology, the vertex classes of the 2D AQP0 data were partitioned using an N-CUBE topology. We used the aligned AQP0 images to train the N-CUBE SOM separately for values of N=1, 2, 3, in order to cluster a maximum of $2^N$ vertex classes, respectively. The same number of training cycles (300,000) and initial learning rate (0.1) were used in the following runs.

For N=1, we used a 225×1 output grid. After training, we generated two vertex classes by taking the images from the two vertices and their immediate neighbors. Enough neighbors were used to bring the numbers in the two partitions to 168 for the left partition, and 171 for the right partition.

For N=2, we used a 15×15 output grid in order to keep the number of neurons the same as in the N=1 case. After training, we generated 4 classes by taking the images from 3×3 arrays at the vertices. These arrays were used because they are the smallest that contained an adequate number of images to generate 3D reconstructions (LL, 174; LR, 167; UR, 182; UL, 179 images, respectively).

For N=3, we used a 6×6×6 output hypergrid. This grid was selected because, of all the $N^3$ networks, it is closest in number of neurons to 225, the hypervolume of the N=1 and 2 cases above. After training, we generated 3D reconstructions from all 8 vertex classes. We selected 2×2×2 arrays from the vertices in order to harvest a number of images adequate for 3D reconstructions (136, 148, 158, 159, 164, 168, 174, 181 images, respectively).

Figure 7:
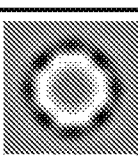
FIG. 7 illustrates AQP0 2 dimensional vertex classes, according to one embodiment of the invention.
Figure 7:
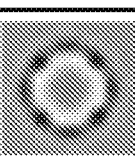
Figure 7:
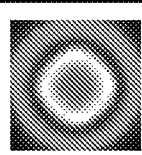
Figure 7:
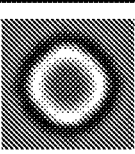
Figure 7:
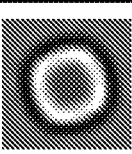
Figure 7:
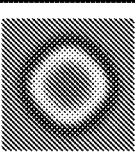
Figure 7:
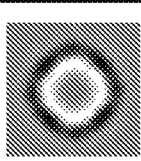
Figure 7:
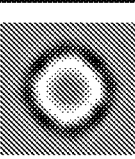
Figure 7:
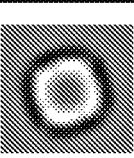
Figure 7:
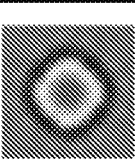
Figure 7:
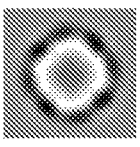
Figure 7:
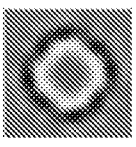
Figure 7:
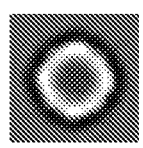
Figure 7:
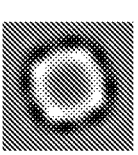
Figure 7:
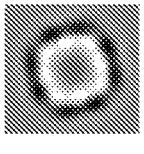
Figure 7:
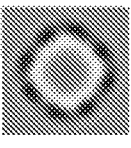
Figure 7:
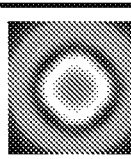
Figure 7:
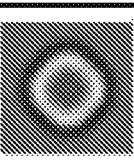

When we compared the class averages shown in FIG. 7 with the ones obtained in a previous study (Zampighi et al., 2003), the output B vertex classes produced by SORFAC exhibited very similar overall dimensions and shapes to the classes calculated by the alignment through classification procedure (Zampighi et al., 2003). The particles ranged from 92.1-112.0 Å for N=1, 93.9-106.3 Å for N=2, and 96.0-106.0 Å for N=3. There is a correlation between an increase in N and a decrease in the angstrom range.

For N=2, three of the vertex classes of output B exhibited similar octagonal shapes but different sizes (Class A, C, and D in FIG. 7). The fourth vertex class exhibited a smooth tetragonal shape (Class B). A second independent run also produced a smooth tetragonal vertex class. This time, however, two vertex classes (Class E in FIG. 7) of very much different looking octagons appeared, with nearly 90° and 180° internal angles. These octagons had been located at a non vertex position in the first run. On the contrary, the octagonal vertex class found in the first run was located at a non vertex position in the second run. The N=3 hypercube, however, captured all of the above shapes. It was more encompassing, capturing size and shape categories common to all of our independent runs using N=1, 2, and the cylinder (FIG. 7). Apparently, more than 4 classes are competing for the 4 vertices in the N=2 case, and more than 2 in the N=1 case.

After obtaining the vertex classes, the corresponding tilted views were used to reconstruct the 3D molds of AQP0, as in the previous study (Zampighi et al., 2003). These (shown in FIGS. 8-10) appeared as cups with external convex and internal concave surfaces. Imprints, which represent the molecular envelopes of the particles, were calculated from the concave surfaces of the molds.

3.2.1 Populations A and B of 3D Reconstructed Molds

The molds' dimensions were similar, but their structural features differed. When we examined reconstructions corresponding to classes isolated with N cubical arrays for values of N from 1 to 3, we observed that two populations of molds could be identified. Population A is characterized by four large elongated depressions in the concave side of the mold, depressions that are separated by 24.2-27.5 Å. Adjacent depressions are at right angles to each other. Population B is characterized by four ring-like structures at the base of the concave side of the mold separated by 47.5-51.7 Å, and by four elongated depressions ("footprints") that are separated by 30.0-38.0 Å. An example of one or more members from each population is shown in FIGS. 8 and 9, respectively.

3.2.4 Comparison of Populations A & B to 2D Classes

We found that the 2D AQP0 classes C and D (FIG. 7) yield molds that are members of population A. Population B molds are produced by classes A, B, and E. The smaller 2D image classes correspond to population A molds, and the larger 2D classes to population B molds. Classes of group F yielded molds that belonged to either population A or B.

Figure 8:
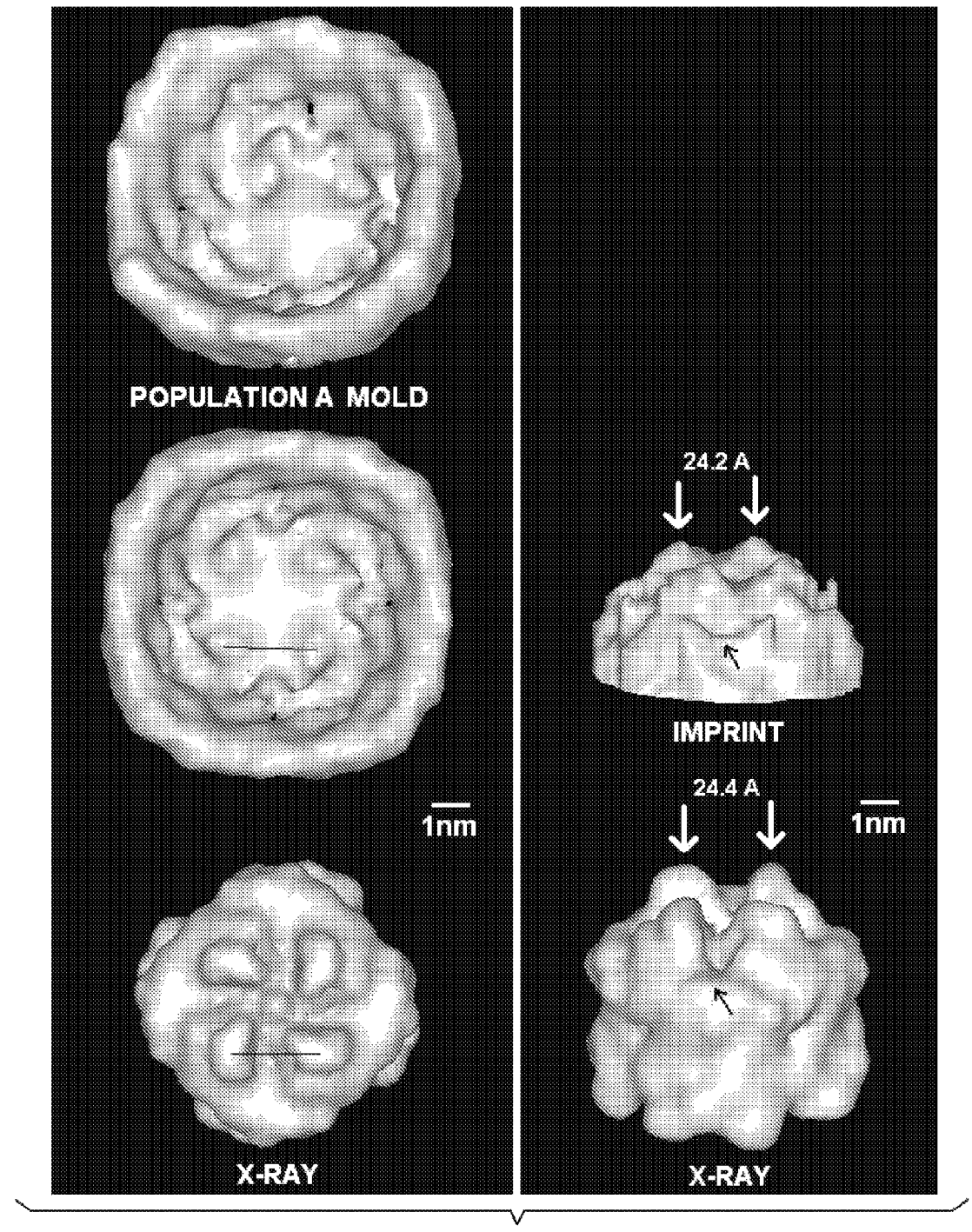
FIG. 8 illustrates a comparison of an AQP0 population A member with the extracellular domain of the AQPI x-ray model, according to one embodiment of the invention.
Figure 9:
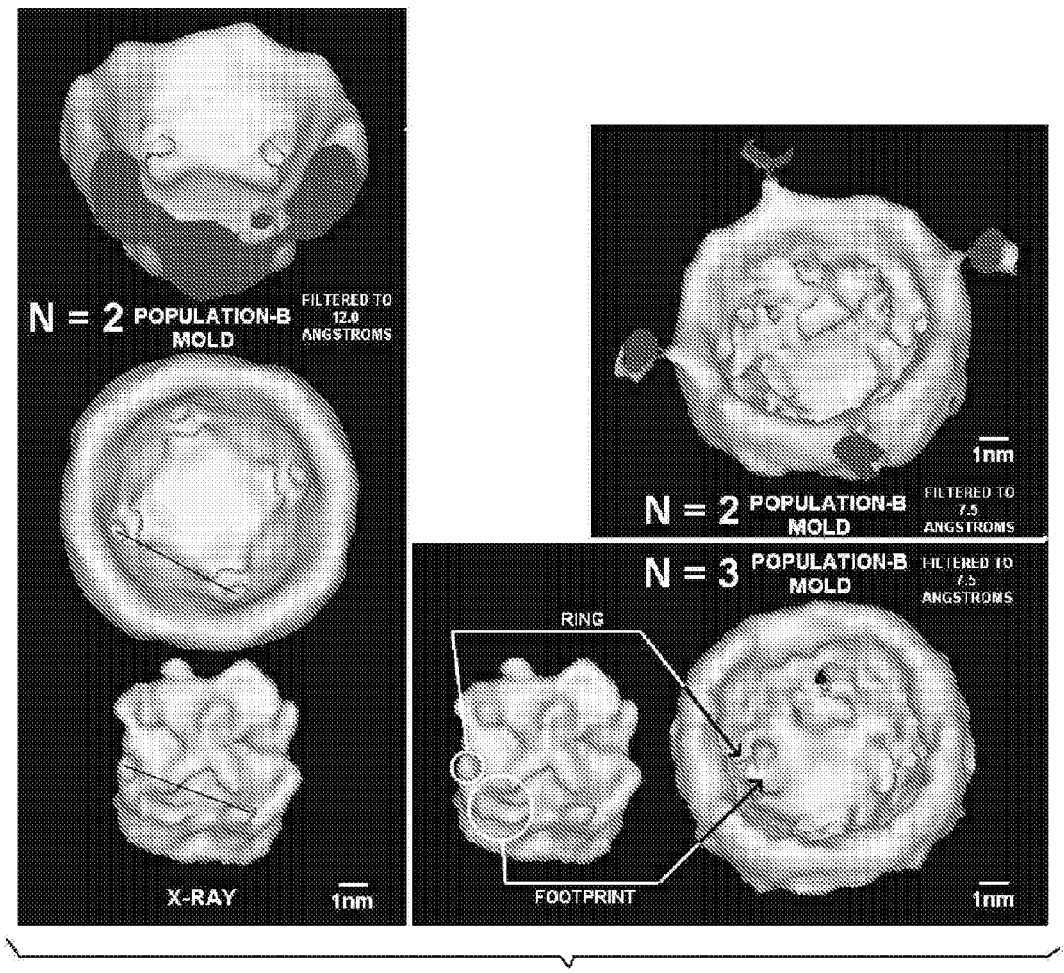
FIG. 9 illustrates an AQP0 Population B representative compared to AQPI x-ray model cytoplasmic domain, according to one embodiment of the invention.

3.3 Comparison of Population A to the Extracellular Domain of the AQP1 x-Ray Model In the two views of the mold shown in the left panel of FIG. 8, four large oval like depressions (seen as depressions in 3D viewing) are present in the concave side. Any two immediately adjacent oval like depressions are at right angles to each other and are separated by 24.2 Å. These features correlate well with the four oval like elevations seen on the extracellular side of the AQP1 x-ray model (FIG. 8). These elevations in the x-ray model are believed to correspond to projecting polypeptide loops that connect to alpha helices (see overlay at bottom left in FIG. 14). Adjacent loop peaks are separated by 24.4 Å.

Like the depressions in the mold, each oval loop density is orthogonal to both of its immediate neighbors. The four depressions in the mold correspond to four elevations in the imprint (right panel of FIG. 8). Two of the four peaks in both the imprint and x-ray model are marked by arrows in FIG. 8. The distances, shapes and orientations of the principal depressions in the mold correlate well with the distances, shapes and orientations of the principal elevations of the extracellular side of the AQP1 x-ray model. By taking cross sections of the molds, we determined that the internal length and width dimensions of the mold average 62.4 Å. The x-ray model dimension of 64 Å is also similar to the values we calculated for the molds.

Figure 10:
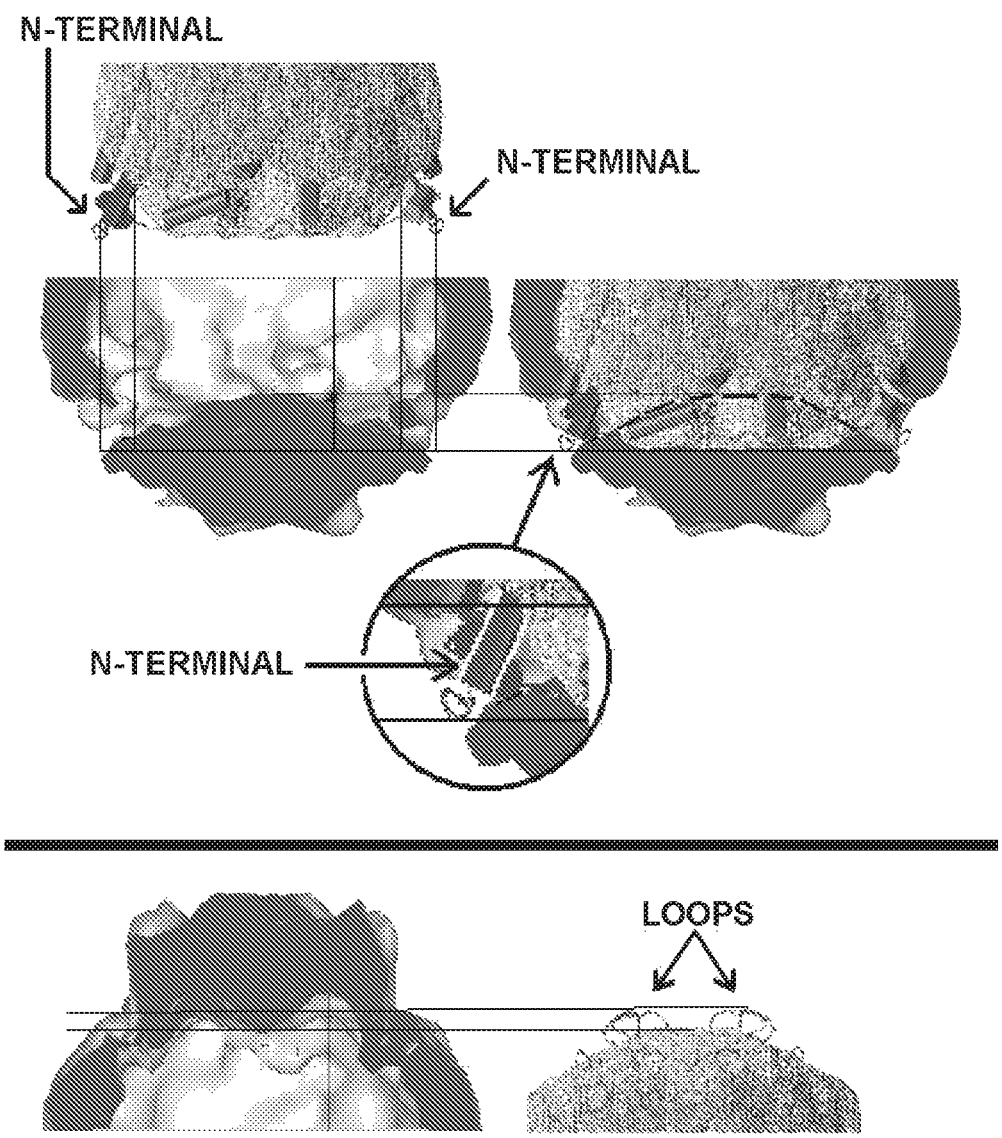
FIG. 10 illustrates an orientation of amino termini in a population-B mold, and the polypeptide loops in a population-A mold, according to one embodiment of the invention.
Figure 11:
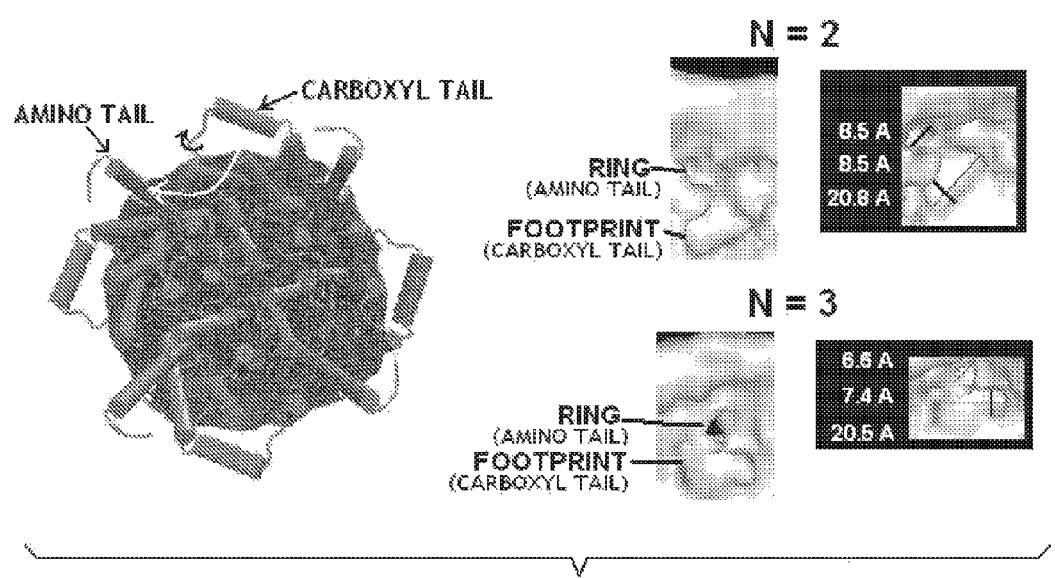
FIG. 11 illustrates an analysis of footprints, according to one embodiment of the invention.

3.4 Comparison of Population B to the Cytoplasmic Domain of the AQP1 x-Ray Model Four examples of molds corresponding to population B are shown in FIG. 9. These reconstructions correspond to a vertex class that mapped opposite to the example used for population A. The observation that classes representing opposite sides of AQP0 map to diametrically opposite vertices of the planar output grid was known (Zampighi et al, 2004). The cytoplasmic side of the AQP1 x-ray model is shown at bottom left), for comparison. Four outwardly pointing elevations ("fingers") can be seen. The endpoints of the thin black line indicate two of the elevations. These correspond to the amino termini of the protein monomers, with 51.0 Å being the distance between them. These elevations correlate well with the rings that are found in the mold at left center (indicated by endpoints of thin black line) that are separated by 50.0 Å. One can imagine the "fingers" fitting into the rings. The inside diameters of the rings are close to the diameters of alpha helices (FIG. 11). The closeness of the orientation match of the amino termini, and the location of the rings and holes with respect to the mold, is illustrated in FIG. 10. Here we fit the cytoplasmic half of the AQP1 x-ray model (docked into the imprint of Zampighi et al., 2004) into our mold. The amino termini of the x-ray model project directly through the rings of the mold and out through four holes in its back. In the case of population B it is easier to see the details in the molds than in the imprints. For that reason, the corresponding imprints are not shown.

The lengths and widths of footprints are consistent with the dimensions of the carboxylic tails in the x-ray model. Shown in FIG. 11 are the footprints for N=2 and 3; they are 20.8 Å and 20.5 Å, respectively, in length, and 8.5 Å and 7.4 Å, respectively, in width. The widths of the holes and of the depressions in the molds yielded by the classes isolated with N cubical arrays for values of N=1-3 are also very close to the diameters of alpha helices. The footprints are found at all intermediate positions directly between the rings, and exhibit differences in orientation.

When molds are reconstructed from classes isolated by using N cubical arrays with higher values of N, both the footprints and the ring-like structures in the molds are significantly more prevalent. Perhaps this owes to the greater homogeneity of the vertex classes at larger values of N. When N=1, neither of the molds has footprints/rings. When N=2 an average (over several runs) of three in eight molds have footprints/rings. When N=3 an average (over several runs) of six in eight molds have footprints/rings.

As can also be seen in FIG. 10, another characteristic of population B molds is that the central portion of the floor of the concave side of the mold presents a dome shaped region of positive density, which would correspond to a dome shaped region of zero density in the imprint. In the AQP1 x-ray model there is a "crown" made up by the amino and carboxylic tails with a zero density inside the crown. By taking cross sections of the molds, we determined that their internal length and width dimensions average 64.9 Å. The x-ray model is similar at an average of 64 Å.

3.5 the Complete Channel

Freeze fracture exposes structures representing only half of the channel. Therefore, we needed to sum the heights of the respective half channels to obtain the complete length. This calculation yielded a mean value of 67.2 Å.

We report a method of analysis of the unsymmetrized AQP0 data set in Example 4.

4. Discussion 4.1 Rationale of Image Reconstruction Procedures

Our first goal was to develop a reference free technique for determining relative rotational orientations of 2D EMs by exploiting the SOM's remarkable topology, metric conservation, and parallel processing architecture. It is known that, when the SOM maps high dimensional input data (e.g., a set of EMs) onto an output grid, it tends to conserve the data's topological structure and metric. In particular, given the limits of the topology of the network, it tends to conserve the topology of the principal variations in the training set. We increased the weight of angles, as principal linear variables in the data set, by extensive training of the SOM with images in random orientations. This tends to establish a linearly calibrated azimuthal axis in the mapped to output space and to eliminate angular bias during training. This follows from Kohonen's demonstration that inputs that occur with greater regularity during training, map into larger output domains (Kohonen, 2001). Because angular variation is unbounded, an unbounded coordinate axis was needed. Otherwise, the numbering system along the axis would be meaningless, because any azimuth augmented by the angle of symmetry must restore the same axial position.

In view of the above, we attempted to match the topology of the grid to that of the data. First, consider the principal topological characteristics of the data when using the RCT method. Because the particles are largely free to rotate in the plane of the bilayer, there will be topologically unbounded rotational variation in the data (a full rotation is unbounded). Also, because the particles are either "flipped" one way or the other in the bilayer, this type of variation is topologically bounded (by the two domains of imaged particles). Other types of variation include differences in molecular conformation, which also appear to map to the network's vertices during structural difference classification.

We anticipated, that if the above matching was achieved, the network, in attempting to conserve the topology of the data on the grid's surface, would map unbounded variations around topologically unbounded directions, and bounded variations along the grid's topologically bounded directions. By matching the topology of the output grid to the data in this way, we expected the network to establish an intrinsic coordinate system on the grid's surface.

One of the coordinates would be our first unknown, the azimuth; the other would be our second unknown, the orientation in the plasma membrane. The first piece of information would be precisely what is needed to generate 3D reconstructions. Kohonen (1982) demonstrated that the SOM maps similar data set images to neighboring regions on the output grid. For that reason, we expected azimuthal changes to be monotonic around the circumference of the cylindrical grid. When referring to the network's system of cylindrical coordinates, we call the unbounded axis (the axis wrapped around the cylinder circumference) the "azimuthal axis" (bottom of output B in FIG. 3), and the bounded axis the "height axis" (left edge of output B in FIG. 3).

With the above expectations, we implemented an output grid topology that is both bounded and unbounded. One such topology is the above mentioned cylinder, unbounded around any circumference, and bounded along any direction perpendicular to it (the cylinder's top and bottom are its topological boundaries). As we expected, after the network was trained using a cylindrical grid, images corresponding to a particular relative azimuth were mapped appropriately around the cylinder's circumference, and those corresponding to the data set's principal bounded variation, size, were mapped along the cylinder's height. In other words, azimuth and size were mapped in a cylindrical coordinate fashion.

This technique, making use of a cylindrical output coordinate system for reference free alignment of 2D particles, is referred to as, "Cylindrical Topology-Self Organizing, Reference Free Alignment" (CT SORFA). The cylinder, however, is not the only topology that meets these requirements, merely the simplest. A unique characteristic of SORFA is its exclusive dependence on the SOM for reference free rotational alignment of translationally aligned, 2D particle images. The learning coefficient, number of iterations, learning radius, and height and circumference of the cylinder, were all varied to probe for improvements in the final mappings, with results summarized in section 2.5.

Figure 15:
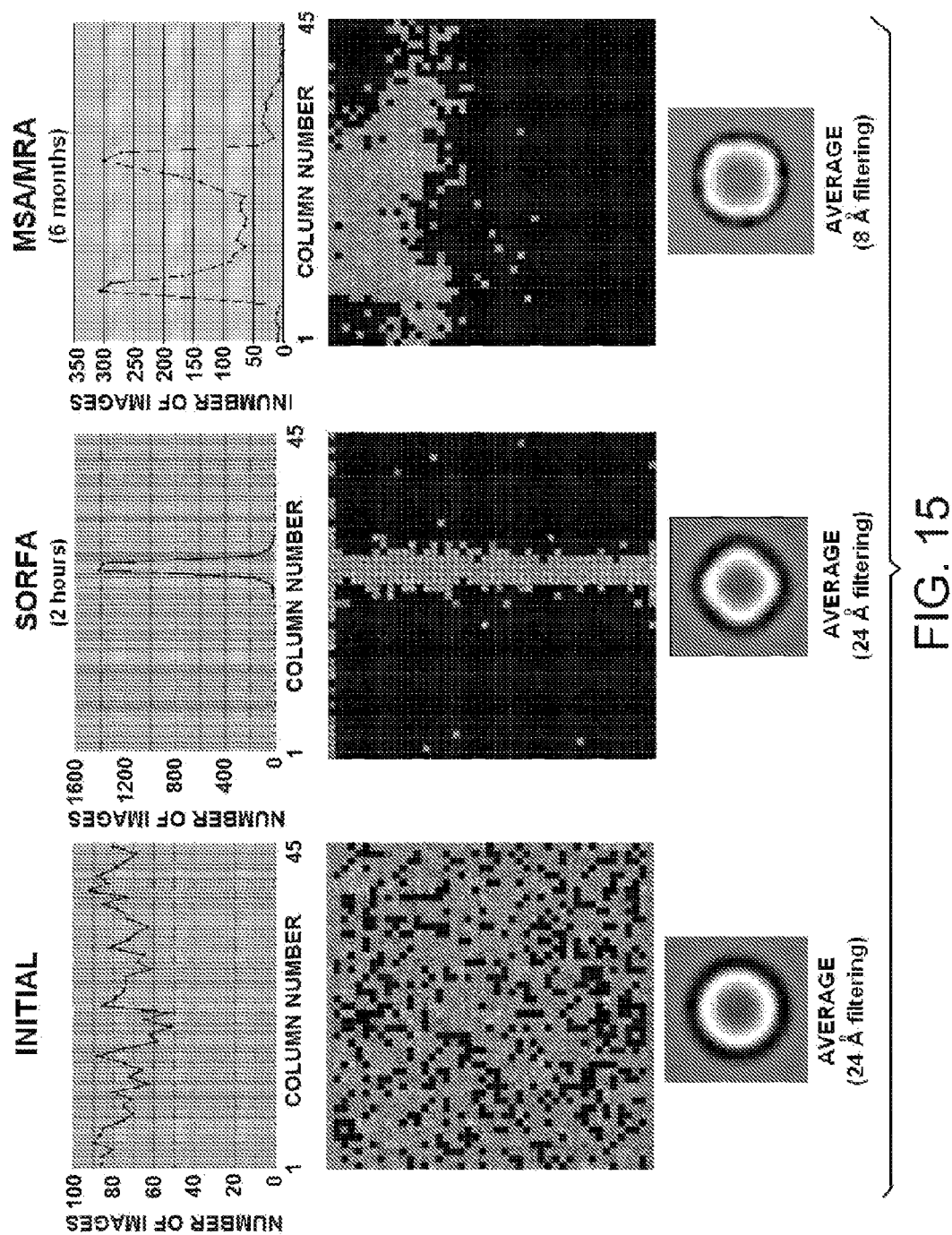
FIG. 15 illustrates a comparison of test runs using non-aligned, SORFA aligned, and MSA/MRA aligned AQP0 images, according to one embodiment of the invention.

The SORFA method contrasted with the alignment through classification method in both speed and lack of operator dependent references. It entailed only hours of computer processing as opposed to months. This included the extra time that was necessary to arrive at the best initial learning rate, and optimal circumference/height ratio of the cylinder. FIG. 15 shows 3 test runs (3 left most) under the same conditions (45 neuron×45 neuron cylinders at 300,000 iterations, and a learning rate of 0.001) using the same 3,361 AQPO data set, but with three different modes of alignment (from left to right): 1: using initial non-aligned images; 2: using SORFA aligned data {alignment took ~2 hours); 3: using MSA/MRA aligned data (alignment took ~2 weeks using 6 rounds of MSA/MRA). FIG. 15 also shows the test run of an independently produced MSA/MRA aligned set, also using the same test run conditions (far right). The data set was nearly identical, but was filtered to 8 Å instead of 24 Å for the alignment and classification stages. The images also used very tight masks, and consisted of 3,366 images. Operator error likely resulted in the double peak in this MSA/MRA aligned test run. The excessively tight masking resulted in the images being mapped to the upper half of the cylinder, as can be seen in FIG. 15 (far right).

We have demonstrated that SORFA accommodates both the artificially generated test sets (of various symmetries) and symmetrized and unsymmetrized EMs. SNRs for alignment as low as 0.25 do not require initial parameter alterations or materially affect the accuracy and precision of the azimuths. After largely removing rotational variation with CT SORFA, the topology is switched from cylindrical to ND hypercubical, in order to partition more homogeneous clusters (representing the different conformations and views of the object being studied), and to control the number of the vertex classes generated. Values of N=1, 2, and 3 were used. Further, it is easy to evaluate particle alignment, and no assumption need be made about a reference image.

Because of SOM's metric preserving characteristics, highly dissimilar classes of input image are clustered to maximally separated regions of the hypergrids. Because these regions in the N-CUBE are located at diametrically opposite vertices, the N-CUBES clustered these classes within the vicinity of the $2^N$ vertices. The strength of SORFA, in mapping the principal classes to the vertices, was demonstrated even when the test images were not perfectly aligned.

4.2 Interpretation of Results
4.2.1 Relating to Procedures and Earlier Findings

The results of 3D reconstructions from partitions, taken for N=1, 2, 3, are shown in FIGS. 8 and 9. A reason why partition homogeneity significantly increases for higher dimensional hypergrids (FIG. 1G) may be the decreased data compression when mapping high dimensional data onto yet higher dimensional hypergrids. When multiple differences exist, such as macromolecular conformational variations, perhaps they can become better separated in higher, rather than lower dimensional spaces, by virtue of additional degrees of freedom. Perhaps this accounts for the lesser contamination in higher dimensional vertex partitions. A disadvantage is that, in practice, one cannot determine whether all principal classes are represented at the vertices, or whether N is needlessly high.

The new features in the molds are located precisely where previous volumes were unaccounted for (Zampighi et al., 2003). These volumes are just outside the envelope of the cytoplasmic domain, as determined by Zampighi et al. (2004), where docked amino and carboxylic termini of the x-ray model project (FIG. 10). We expect to see holes and footprints in the molds, corresponding to opposite densities of amino and carboxylic termini and, indeed, they are seen. The footprints, however, are indeterminately located between the holes/rings at a mean distance of 25.2 Å from the central axis of the mold. For example, in the mold of the unsymmetrized alignment (see FIG. 14 and Example 4), we see the footprint in an intermediate position, and at a different angle. If footprints are depressions made by carboxylic tails, one way to account for the orientation change would be the ability of carboxylic tails to rotate and/or change conformations (indicated in FIGS. 11 and 14). In FIG. 11, the carboxylic terminus would be proximal to the amino terminus of the adjacent monomer.

4.3 Future Applications

Future applications of SORFA to SOMs other than the Kohonen SOM, used in the above illustrations, could generate better topographic orderings; for example, fuzzy Kohonen clustering networks (FKCN) (Pascual et al., 2000) and KerDenSOMs (Pascual Montano et al., 2001), and Parameterized Self-organizing Maps (PSOM), where continuous mappings may be attained (Walter an Ritter, 1996). Another application would use hypersimplex arrays, where the number of vertex classes would not be limited to multiples of two, but could be set to any positive integer. Finally, the Euler angles needed for angular reconstruction of cryo-electron microscopical data may be obtainable from other topologies like, for example, spherical, hyperspherical, toroidal, hypertoroidal, etc., depending on the topology of the cryo-data-set and the symmetrie(s) of the 3D object(s) being studied. SORFA could also be parallel processed, not simply emulated using serial computing. Then, all the neurons could be compared and updated simultaneously, not just in sequence. Such a parallel processed architecture could be implemented on a microchip. It promises to speed processing by several orders of magnitude. For example, processing on a 45×45 neuron cylinder, with 2,025 neurons, would expect to run at least 2,025 times faster, when parallel processed thereby decreasing processing times to a few seconds, or less.

Beyond their independent applications, these new techniques also promise to extend the utility of the familiar x-ray and electron crystallographic space filling, ribbon, and cylinder and loop, reconstructions, as well as those of other advanced imaging methodologies. A main advantage is that crystallization is not employed. Consequently, many objects can be examined in close to their native conformations. Among many other anticipated applications, the new techniques could significantly impact neurophysiology and drug design and discovery. Further, being independent of object size, they might find applications from very large macromolecular assemblies, such as ribosomes, to medical patient diagnostics where repetitive movements and only tens of milliseconds exposures are involved, for example, high speed cardiac MRI.

The present invention is more particularly described in the following examples which are intended as illustrative only since numerous modifications and variations therein will be apparent to those skilled in the art. The following examples are intended to illustrate but not limit the invention.

Example 1. Locating the Vertices of a Tesseract and Calculating Distances Along a Cylindrical Surface Locating the hypercube vertices for the cases N=1, 2, and 3 is straightforward, because lines, squares, and cubes are easily visualized. However, visualization of the N=4 tesseract geometry is more difficult. In spite of this, the vertices are easily located by simply "counting neurons." The neurons (identified by their coordinates in 4 space) are first ordered using a simple raster convention. For example, a 3×3×3×3 hypercube with $3^4$=81 neurons are numbered as follows in 4-space: 1: (0,0,0,0), 2: (1,0,0,0), 3: (2,0,0,0), 4: (0,1,0,0), 5: (1,1,0,0), 6: (2,1,0,0), 7: (0,2,0,0), 8: (1,2,0,0), 9: (2,2,0,0), 10: (0,0,1,0), . . . , 81: (2,2,2,2). For a tesseract of length, L neurons, the 16 vertices are located by counting off the following neurons (see FIG. 2 for a 2D projection of a tesseract).

V1=1 V5=(L−1)L2+1 V9=1+L4−L3 V13=(L2+1)L2+1
V2=L V6=(L−1)L2+L V10=L4−L3+L V14=L4−L2+L
V3=L(L−1)+1 V7=(L2−1)L+1 V11=L4−L3+L2−L+1 V15=(L3−1)L+1 V4=L2 V8=L3 V12=(L2−L+1)L2 V16=L4

For the 3×3×3×3 hypercube L=3. Therefore, the 16 vertices are located at: VI=1, V2=2, V3=7, . . . , V16=81. After training the 4 cube, ~(150-200) images are harvested from the images mapped to each of the 16 vertices and their immediate proximity (to bring the number up to the 150-200 range) of the output tesseract, and used to generate 16 3D reconstructions. Faster camera sampling rates (>1/3.1 Å), and improvement in other factors required for better resolution attainment including, but not limited to, decreased spherical aberration (<2×106 nm), decreased electron wavelength (<0.00335087 nm), reduced defocus maxima [<(200-300) nm], etc., may require larger numbers of images to be harvested in order to achieve the best results.

When calculating distances from the winning image on a cylindrical surface, the network only considers shortest distances. We represent a point on the surface of a cylinder of a given height, H, and circumference, C by (a, h) where "a" is the azimuthal coordinate and "h" is the height coordinate (see Results). The formula for the shortest distance on the surface of a cylinder between points (a1, h1) and (a2, h2) is:

$$\min\{[(a1-a2)^2+(h1-h2)^2]^{1/2}, [(C-|a1-a2|)^2+(h1-h2)^2]^{1/2}\}.$$

Example 2. The Importance of Choosing a Low Value for the Initial Learning Rate Lower values of the initial learning rate allow the output grid images to gradually adapt to the data, so that each image presentation has only a small influence on the output grid. The advantage is that the grid is not forced into an initial bias during early training. A sufficiently low value of the learning rate eliminates training bias because the alignment results become independent of the order of the images used to train the network. This is because a continued reduction of the influence of the training images during training (a continued reduction of the learning rates, with a corresponding increase in numbers of iterations) has no effect on the alignment precision between independent runs. The choice of the right learning rate is critical for global alignment of the training set, because values of the learning rate that are too high cause small amounts of grid image rotation along the height of the trained cylinder (particularly with much heterogeneity in the training set). Contrariwise, one wants all rotational variation to be confined along the azimuthal axis.

The network will be over trained or under trained, if the initial learning rate is too large or too small, respectively (without compensating by decreasing or increasing the number of iterations, respectively). When it is optimally trained, the test run's histogram has the narrowest distribution. We have empirically observed that, when the network is optimally trained, the grid images in output A vary from very similar, to nearly indistinguishable from the aligned average of all images.

When the network is over trained, all the grid images no longer resemble the aligned average of all images combined; instead, some are distinct looking, aligned subclasses. During training, the grid images move from a random state to one resembling the average of all aligned images, when training is complete. Moreover, with over training, they differentiate into distinct subclasses, plainly evident upon visual inspection. Inspecting the grid images in this way is useful to quickly assess quality of alignment before completing the test run (see Materials & Methods). The test run, however, is the definitive tool for evaluating qualify of alignment.

Example 3. Angular Deviation from Linearity as a Function of the Total Number of Training Cycles For images with 4 fold' symmetry, for example, the range of azimuthal angles is 0° 90°. Consider a series of 90 boxes, where all of the boxes are labeled in the following way: Box 1, 0°-1°; Box 2, 1°-2°; etc., down to the last box; Box 90, 89°-90°. Think of a ball being dropped into a box of a given angle range, whenever an image is presented to the network, during training, with that given azimuthal angle range. A perfectly linear distribution of presented angles during training would then arise whenever exactly the same number of balls was in each of the 90 boxes, at the end of training. This number would be equal to the average. That is, the total number of images presented during training divided by 90. In practice, however, because the distribution is random, some boxes will have more balls than others, which accounts for the non-linearity of the angle distribution. Therefore, the deviation from linearity is the deviation from the mean. An overall measure of this deviation from linearity is the standard deviation of the distribution of all deviations from linearity across all boxes.

The Kohonen network, however, is not concerned with the absolute value of the angular deviation from linearity, but its percentage of the whole. This is because, when an image makes up a larger percentage of the images used for training, the image's influence in the final map will be greater. Correspondingly, if the deviation from linearity is a smaller percentage of the totality of presented angles, the influence will be lesser. In view of the above, we define the measure of influence of nonlinear angle presentations to be 100% times the standard deviation of the departures from linearity across boxes, divided by the total number of balls.

Figure 12:
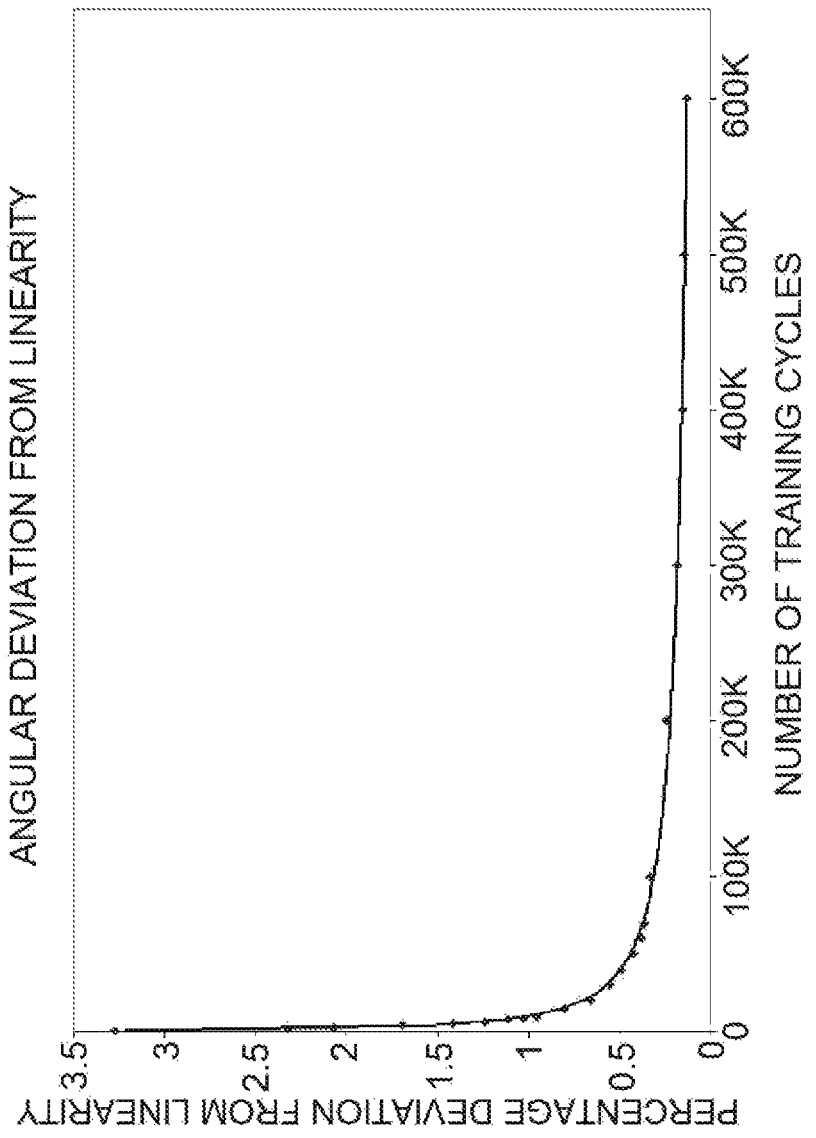
FIG. 12 illustrates the angular deviation from linearity as a function of the number of iterations, according to one embodiment of the invention.

In FIG. 12, the percentage deviation from linearity is plotted against the total number of training cycles. Note that between ~100,000 and ~300,000 training cycles, the hyperbolic looking curve essentially bottoms out. At 300,000 training cycles, the deviation from linearity is 0.18%. Since beyond 300,000 training cycles there is not much reduction of non-linearity we chose 300,000 training cycles in our final alignment runs.

Example 4. Classification and 3D Reconstruction of Unsymmetrized AQPO

Figure 13:
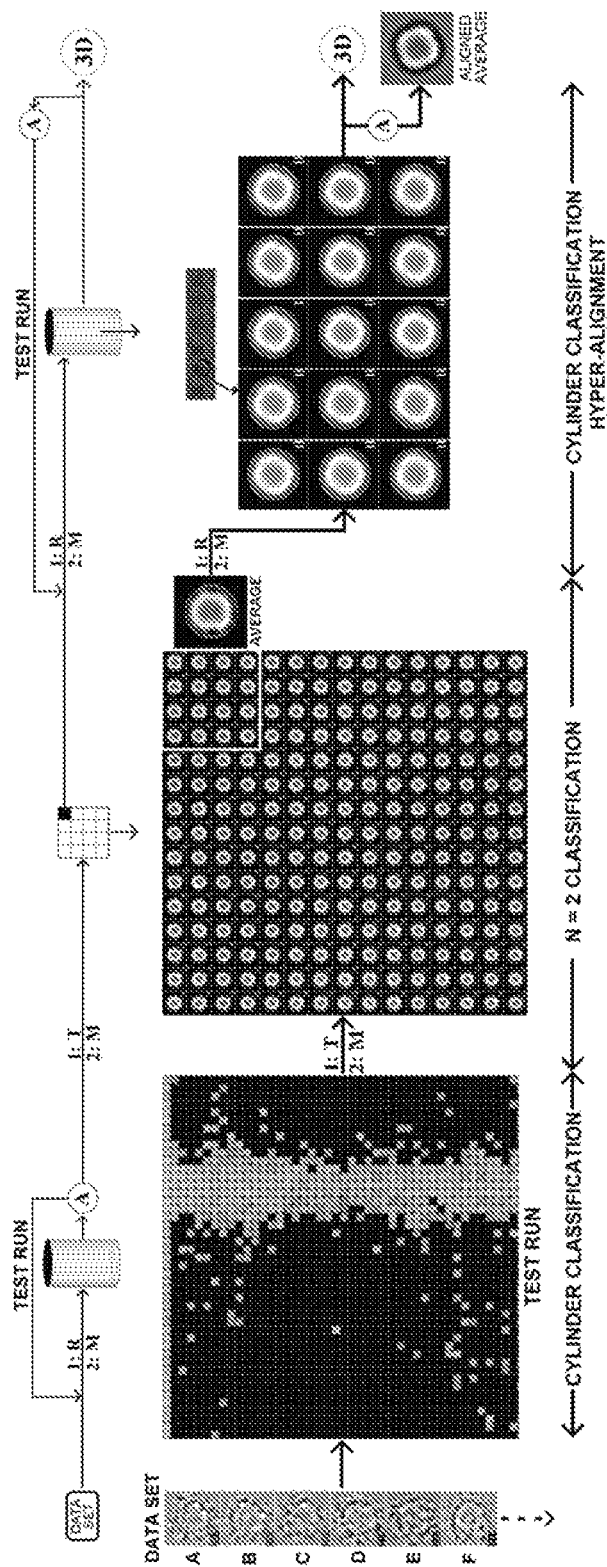
FIG. 13 illustrates an unsymmetrized azimuthal angle classification and alignment of AQP0, according to one embodiment of the invention.
Figure 14:
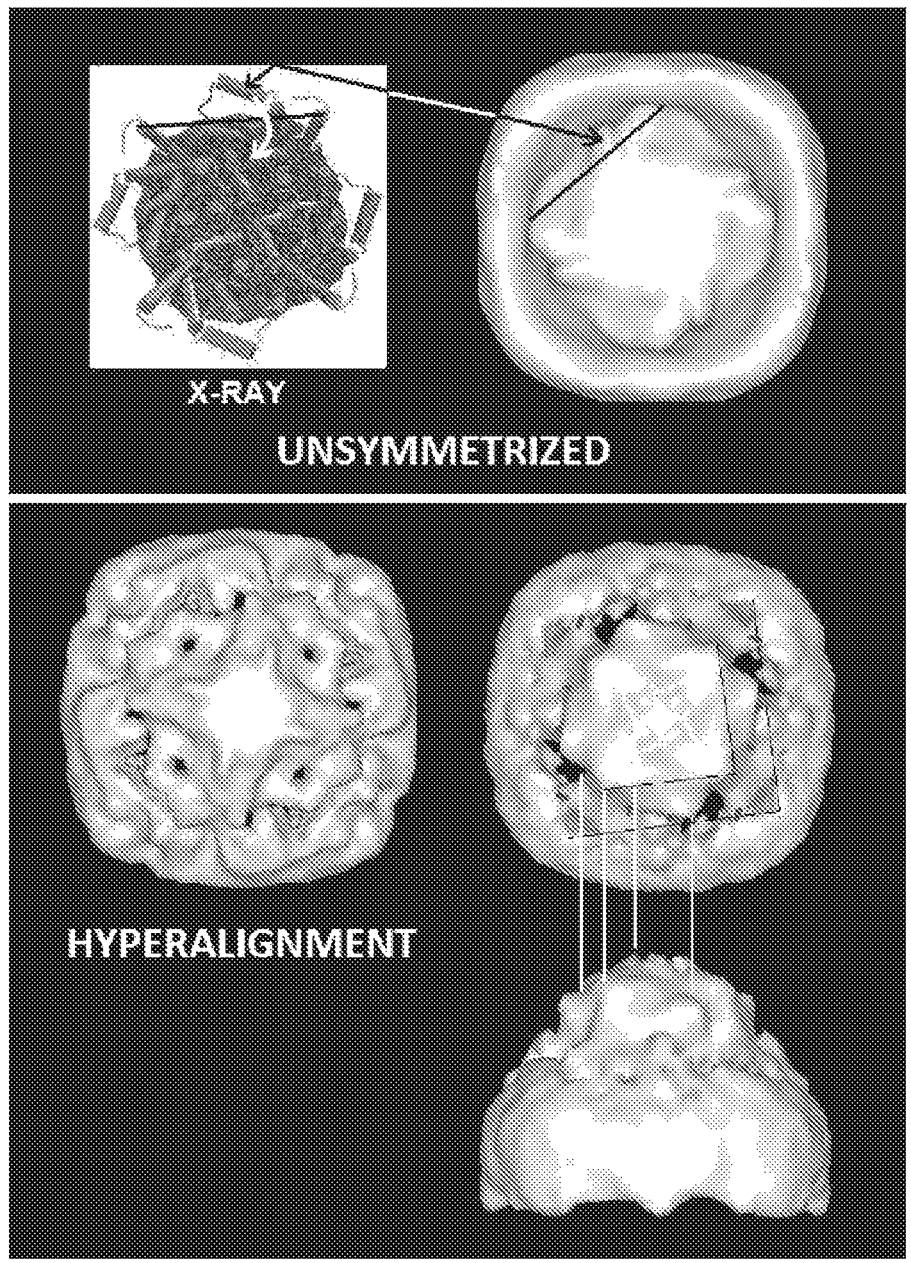
FIG. 14 illustrates replicas generated from symmetrized and unsymmetrized alignment and classification, according to one embodiment of the invention.

The unsymmetrized AQPO data set was aligned in a 45×45 neuron cylinder with a learning rate of 0.001. Images in output A rotated 180° across the circumference of the grid, indicating a majority has 2 fold symmetry (not shown), with output B results shown in FIG. 13. The 2 fold symmetry may be partly due to the elongation of many 2D untilted images, as a result of their tilt angle not being exactly 0°. The aligned images were then used to train SORFA with an N=2 hypercubical topology, with output B results shown in FIG. 14. To quantify and refine the precision of calculated azimuths of the unsymmetrized AQPO data set, the clusters closest to the 4 vertices were selected. For example, the upper right vertex class was selected and used to retrain SORFA, but with a cylinder circumference of 100 neurons, a cylinder height of 10 neurons (best test run), a learning rate of 0.001 and 300,000 iterations. The images rotated 90° around the grid, indicating that this subset had an overall 4 fold symmetry. The grid images in output A resemble the aligned average (FIG. 13). The 3D reconstruction corresponding to this aligned class is shown in FIG. 14 (top right). This mold has characteristics of population B, except for the presence of rings. The four footprints are separated by 36.8 Å. The inside length of the mold is indicated by the blue line and is 64.2 Å.

Example 5. Hyperalignment and 3D Reconstruction of Symmetrized AQPO

We also test d a method to "refine" the alignment of the images. Hyperalignment is the re alignment of the aligned images, or starting images (in order to prevent accumulation of aliasing and/or rounding errors due to successive rotations of the same image), in order to refine the azimuths, but using subsets generated from SORFA (such as a vertex partition) that have greater homogeneity. The subsets are selected from within neighborho9ds anywhere in the N cube SOM's hypervolume, after structural difference classification. As an example of this procedure, we took the vertex partitions from the N=2 case, above, ~(167 182) images and individually realigned them with SORFA (see FIG. 16). Azimuthal axis resolution was increased by increasing the cylinder circumferences to 100 neurons (0.9° per column). For example, a cylinder height of 5 neurons produced the following test run statistics for the upper left vertex class of the 2-cube SOM (see FIG. 16): 98.3% of images accurate to ±1.8°; 96.1% to ±1.3°; 81.6% to ±0.9°; 52.0% to ±0.4°. We used cylinders that were 5 neurons high for the hyperalignment runs of AQPO because these produced test runs with the lowest standard deviation. The learning rate and number of iterations were maintained at 0.001 and 300,000, respectively.

An example of a hyperaligned 3D reconstruction from the lower right hand vertex partition of the N=2 case is shown in FIG. 14.

FIGURE LEGENDS

Figure 3:
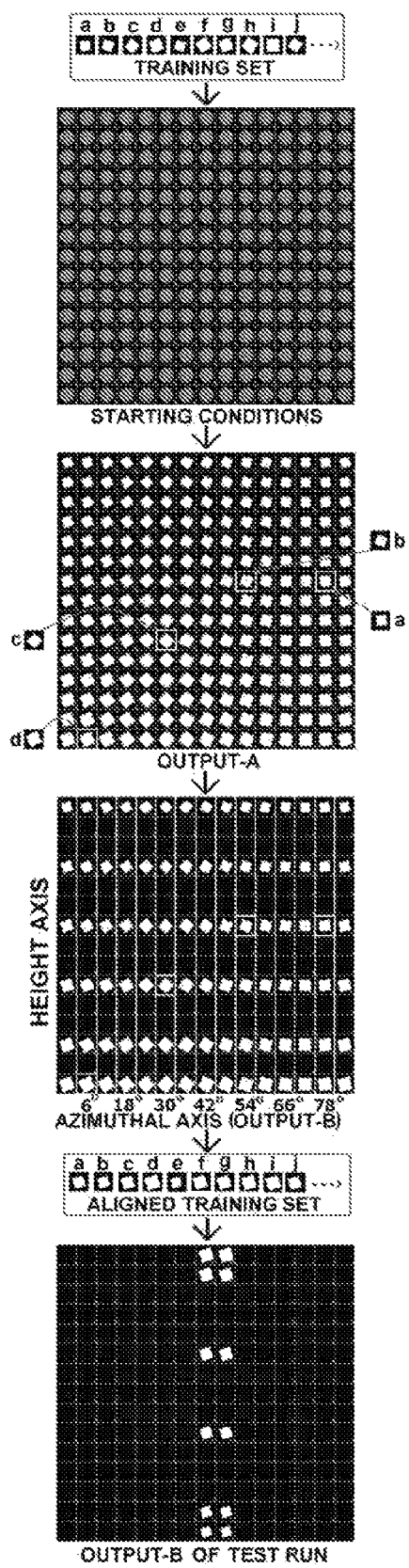
FIG. 3 illustrates azimuthal angle classification and alignment of synthetic population of white squares, according to one embodiment of the invention.

FIG. 1. Flow charts for SORFA general and example case.
FIG. 2. Schematic diagram of SORFA. After entering the data set and the initial parameters, SORFA is switched to a cylindrical topology and started. After training, the azimuthal angles of the data set images are displayed around the circumference of the cylinder. A test run is performed to measure the consistency of the determined angles. SORFA then is switched to an ND hypercubical array and is trained again, but this time using an aligned set.
FIG. 3. Azimuthal angle classification of synthetic population of white squares. At top, is the training set to be classified by azimuthal angles. Just below, is the output cylinder cut lengthwise and laid flat for visualization. It shows the random-pixel initial conditions, before starting training During training, data set images are presented to the network in random angular orientations. Output images gradually morph to training images. Below the starting conditions is output A, after training; all images along any vertical column are at the same angle but vary in size, while all images along any row are of the same size but at varying angles. Because rotation of the output images around the cylinder is uniform, the circumferential axis may be designated as its azimuthal axis. Training images are then classified by assigning them to positions of greatest resemblance on the output A grid (seen on left and right sides of output A). Training set images <<a" through "d" are shown being mapped to closest matching grid locations. The mapping results are shown as output B. When more than one image is mapped to the same grid location, the average image is displayed. The azimuthal axis at the bottom shows the relative angles (just above output B label) of the images mapped to given columns. If angular determinations are correct, images will be brought into alignment upon applying azimuthal angles (see "aligned training set"). The alignment quality is shown by the degree of narrowness of the vertical band of images of the test run, generated when the aligned images are reprocessed through the cylinder.

FIG. 4. Azimuthal angle classification of AQPI test set. At the top are noisy projections (SNR=0.32) of the two domains of the AQPI x-ray model, in random angular orientations. In this example, the SNR of the images is 0.32. These images were processed by SORFA in the same way as in FIG. 3. Output B shows the cylinder portion for azimuthal angles of 22° to 36°. The azimuthal axis indicates relative angles of images mapped to any given column in output B. Images were then bought into angular alignment by applying their respective azimuthal angles. The average of the aligned images is indistinguishable from that of the original images without added noise. Finally, reprocessing the aligned images through the cylinder performs the test run. The degree of narrowness of the width of the images in the test run indicates the consistency of the alignment angles. The images representing the two domains were perfectly partitioned to the top and the bottom of the cylinder by both output B and the test run.

FIG. 5. Effect of mapping variable numbers of test classes for N=2. The leftmost column depicts 8 generator images used to generate 8 test classes by adding noise and limited random rotations. Examples of images for each of the eight classes are depicted in the second column (Classes C and Dare projections of the AQP1 x-ray model). The upper right panel shows how images are mapped to diametrically opposite vertices when the data set consists of only two principal classes. The center right panel exemplifies what occurs when the numbers of principal classes and vertices are equal: images map to four separate vertices according to class membership. The lower right panel exemplifies what occurs when numbers of principal classes exceeds those of vertices. The largest principal classes are the best competitors for the vertices, which tend to "attract' them. Notice how the 42 image vertex class of the middle panel does not successfully compete with the larger image classes in the lower panel, and is, consequently, not mapped to a vertex.

Figure 6:
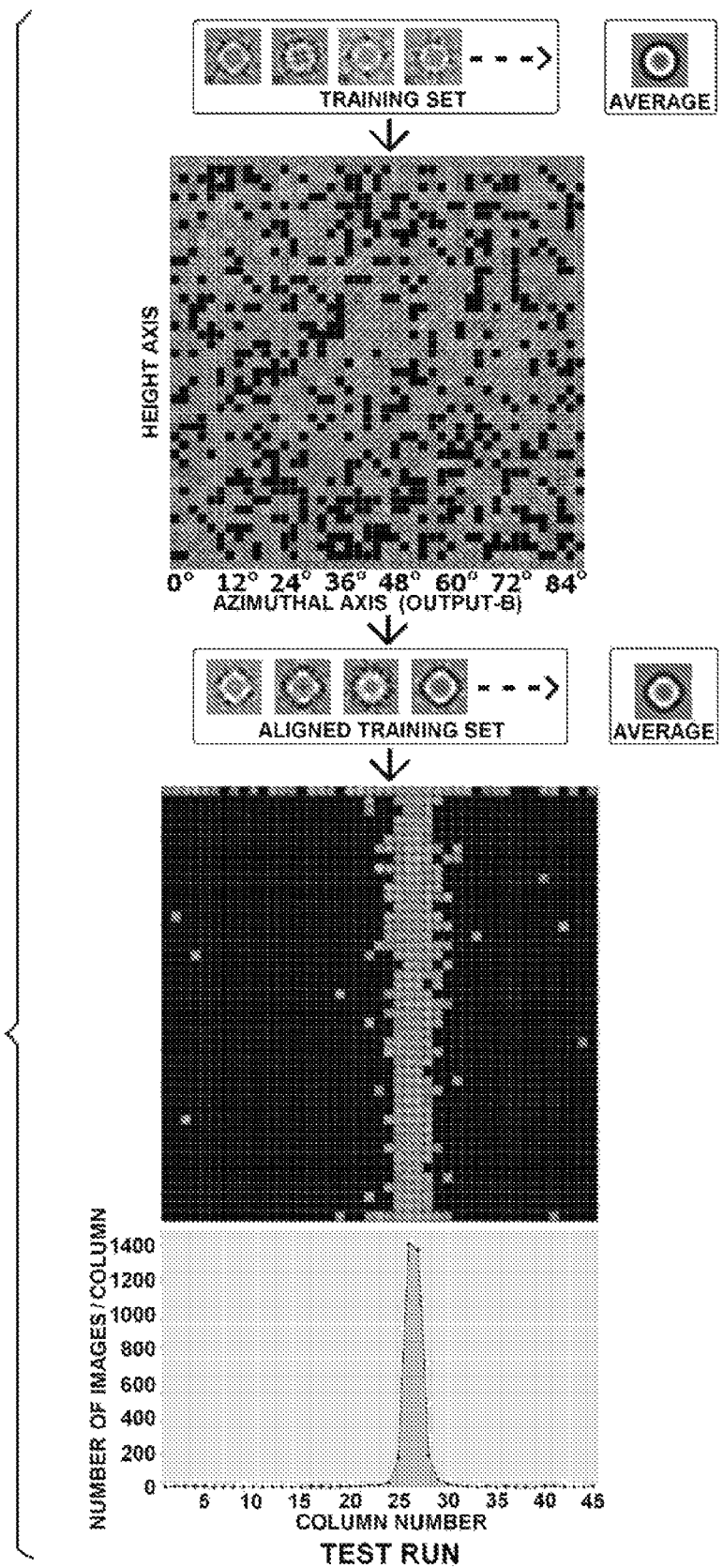
FIG. 6 illustrates azimuthal angle classification and alignment of AQP0, according to one embodiment of the invention.

FIG. 6. Azimuthal angle classification of AQPO. At the top are 4 of the 3,361 images comprising the C-4 symmetry imposed AQPO data (training) set. To the right is the average of all images. The circularity of the average image indicates that the data set is not rotationally aligned. The data set is then processed using SORFA. Output B shows the relative azimuthal angles for all images in the training set. All the images that mapped to a given column in output B have the same relative azimuthal angle, as indicated by the azimuthal axis. The relative azimuthal angles are then applied to the images, producing the aligned training set, the average of the images of which is shown to the right. Below the set are the results of the test run. The histogram of the test run is also shown at the very bottom. Here 82.7% of the images fall into two columns. Therefore, 82.7% of the images are precise to within 2°-4°.

FIG. 7. AQPO 2D classes. The types of classes obtained in several structural difference classification runs. N is the dimension used for the N-CUBE SOM. For N=2, resulting classes of two independent runs are shown. Classes A, B, and E yielded one population of molds with characteristic features. Classes C and D yielded a different population of molds with another set of characteristic features. Classes of group F yielded molds that belonged to either population A or B.

FIG. 8. Comparison of an AQPO population A member with the extracellular domain of the AQPI x-ray model. The top two images in the left panel, are the two views of a population A mold. The top view allows appreciation of the depth of the four large depressions present in the concave face of the mold. These depressions are ovular, and normal to each other. The thick outer borders of these molds are largely extraneous accretions of platinum, not portions of AQP0. For comparison, the extracellular domain of the x-ray model of AQP1 is at the bottom. Polypeptide loops protrude from it as four elevations. Their densities are also ovular, and normal to each other. The thin black lines indicate the 25.6 Å distance between the depressions in the mold and the similarly spaced (24.4 Å) elevated loops in the x-ray model. The imprint of the mold, representing only half the channel, was calculated and is shown in the top right panel. Beneath it is another view of the x-ray model, showing the entire channel. Two arrows, above both the model and the imprint, show the elevations being compared. The distance between elevations in the imprint is 24.2 Å.

FIG. 9. Population B representative compared to AQPI x-ray model cytoplasmic domain. Two views of a population B mold are depicted in the upper left panel. This mold, low pass filtered to 12.0 A, was generated from a class isolated in a 2-CUBE SOM. This class mapped to a vertex opposite to that of the example of FIG. 10. The cytoplasmic side of the AQPI x-ray model is also shown at the bottom of the left panel for comparison. Four outward pointing elevations ("fingers") are present. Endpoints of the thin black line delineate two elevations. These are the amino termini, with a separation of 51.0 A (indicated by black line). Elevations correlate well with rings, with a separation of 50.0 A, found near the mold floor (endpoints of black line). Think of the fingers as fitting into the rings. This mold's negative density would need to correspond to the x-ray model's positive density. FIG. 10 shows that rings and fingers correspond to the same depth positions in the mold. The upper right panel shows the same mold, but with 7.5 A filtering. Footprints are more visible beneath the rings. The lower right panel shows another population B mold, but for N=3. The x-ray model is shown in the lower right panel. One amino terminus is circled small on the x-ray model, and one carboxylic terminus is circled large. One expects the carboxylic termini to leave footprint like depressions. Arrows point to possible correlates between amino and carboxylic termini. The mold footprint has a different orientation from that of the x-ray model carboxylic terminus. Rotation of this terminus would be needed to bring it into the proposed position. FIG. 11 shows that footprint dimensions are close to those of carboxylic termini.

FIG. 10. Orientation of amino termini in a population B mold, and the polypeptide loops in a population A mold. In the top panel, we fit the cytoplasmic half of the AQP1 x-ray model (docked into the imprint of Zampighi et al., 2003) into the mold shown in FIG. 9. The amino termini of the x-ray model project directly through the rings of the mold and out through 4 holes in its back. In the bottom panel we juxtapose the extracellular half of the AQP1 x-ray model (docked into the imprint of Zampighi et al., 2004) next to a population A mold (shown in two views in FIG. 8).

FIG. 11. Analysis of footprints. The center and right columns of images are croppings of the rings and footprints shown in the right panels of FIG. 9. The far right column of images contains axial views, with lines drawn in to mark the corresponding distances. On the left side is the cytoplasmic domain of the AQP1 x-ray model. The amino and carboxylic termini are seen in the outermost perimeter. If the rings correspond to the N termini and the footprints correspond to the C termini, then the C termini would need to change their orientation. One possible mechanism to account for this would be a rotation within the peptide chain, as shown.

FIG. 12. Angular deviation from linearity. The effect of the total number of training cycles on the linearity of the azimuthal axis of the cylinder. We set the number of training cycles for the final run to 300,000, because there is little improvement in linearity beyond this point.

FIG. 13. Unsymmetrized alignment and classification of AQPO. At the far left are 6 examples of the 3,361 images that make up the unsymmetrized AQPO data set. After alignment, a test run is performed. An N=2 classification is then performed. Four 4×4 vertex classes are then generated from the N=2 classification and realigned separately. An example is shown using the upper right vertex class of the N=2 classification. Output B of the second cylinder classification is then shown. Note how the grid images resemble the final aligned average, shown at the far right. As a general rule, with proper training of SORFA, all of output A's images tend to closely resemble both each other and the aligned average.

FIG. 14. Replicas generated from symmetrized and unsymmetrized alignment and classification. In the top half of the top panel are displays of the convex side of the replica obtained by symmetrized alignment and classification. In the bottom half of the top panel are two views of the concave side. On the right side of the lower panel is a mold generated from the unsymmetrized AQPO data set. On the left side is the cytoplasmic domain of the AQP1 x-ray model, with the endpoints of a blue line denoting the amino termini. The endpoints of the blue line shown in the mold on the right are two of the proposed positions for the amino termini. The arrow shows a possible rotation in the carboxylic tail that could account for the orientation of the depression in the mold (also indicated by an arrow).

FIG. 15. Comparison of test runs using non-aligned, SORFA aligned, and MSA/MRA aligned AQPO images. The top row consists of histograms produced from the cylindrical grids that lie directly below. The bottom row of images is the averages of the images used for training the respective test runs. In the first column, the average is circular because the images have not yet been aligned. The SORFA run in column two took approximately two hours to align. 82.74% of the images (2,781 of the 3,361 images) mapped to only two cylinder columns, corresponding to an alignment range of four degrees. This is manifested by an average that has a square shape. The MSA/MRA test run in column three went through six rounds of alignment over a period of approximately two weeks. The corresponding histogram indicates that the data set has only been partially aligned. In the forth column are the test run results from on an independently aligned data set using MSAIMRA. The dual peaks are most likely a result of operator error that occurred sometime during the six months period that it took to perform "alignment." The AQPO data set used in this independently performed MSA/MRA alignment was filtered at 8 A instead of 24 A (as in the other test runs), and masked more tightly. The excessive masking resulted in the images being mapped to the upper portion of the cylindrical grid.

Figure 16:
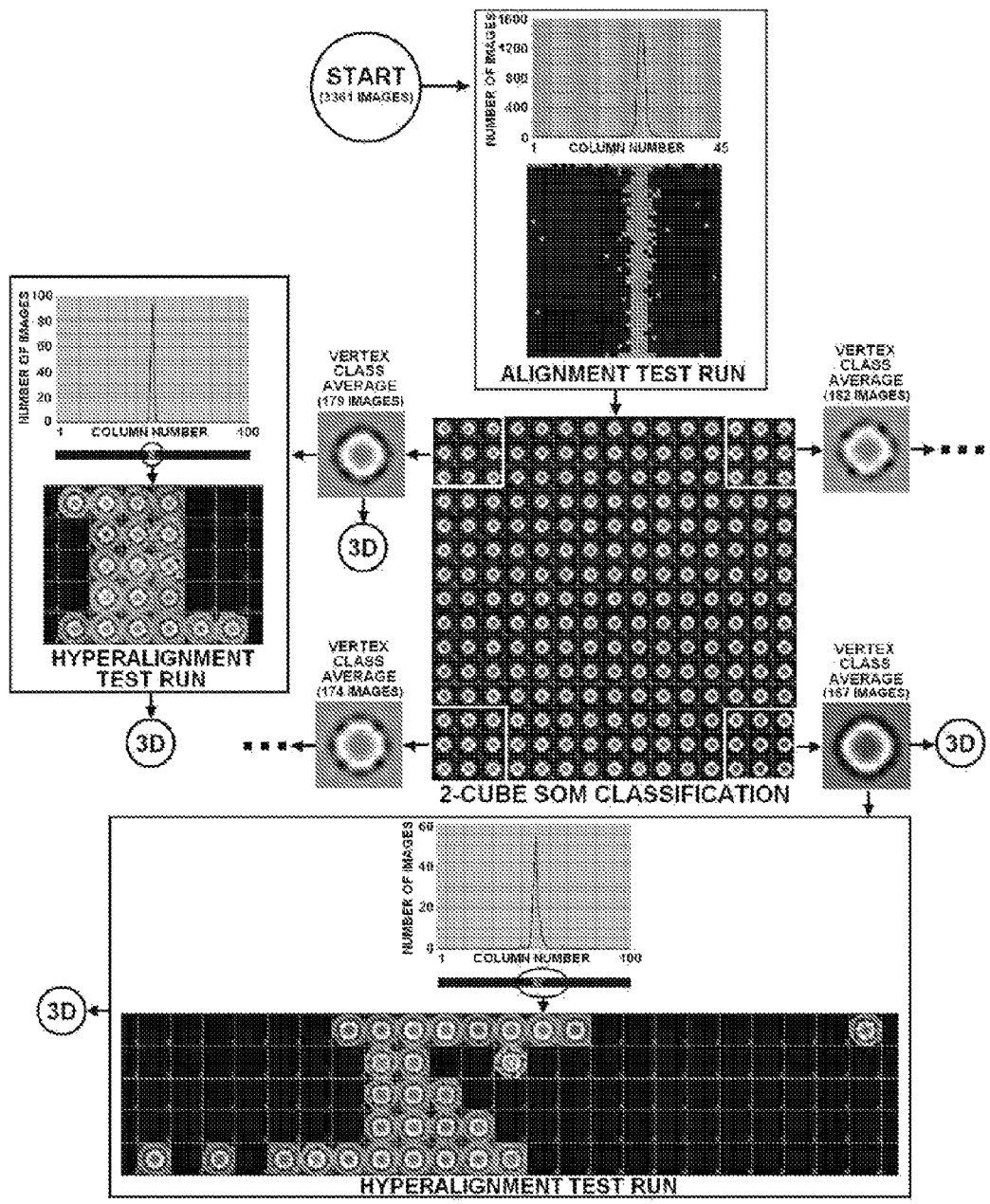
FIG. 16 illustrates alignment and hyperalignment, according to one embodiment of the invention.

FIG. 16. Alignment and hyperalignment. The 3,361 AQPO starting images are first aligned by SORFA, followed by the alignment test run (top rectangular box). Here 82.74% of the images mapped to only two cylinder columns, corresponding to an alignment range of four degrees. The aligned images are then used to train a 2-CUBE SOM (center) in order to generate homogeneous classes. Four vertex classes, consisting of the images mapped to the nine neurons at each vertex, are used here, and their averages are shown. Nine vertex neurons were used because the number of images that mapped to each of them was in the desired range of (160 180). Each vertex class is a homogeneous cluster of untilted images; that are needed to locate the matching tilted images, and the corresponding azimuthal angles, needed to produce the initial 3D model. Each subset of vertex class images is then realigned using SORFA (hyperalignment), followed by a test run. This is only shown for the upper-left and lower-right vertex classes. The hyperalignment performed on the upper-left vertex class produced the following statistics: 98.32% of the vertex class images to within 3.6 degrees, 96.09% to within 2.7 degrees, 81.56% to within 1.8 degrees, and 51.96% to within 0.9 degrees. The hyperalignment performed on the lower right vertex class produced the following statistics: 78.44% to within 3.6 degrees, 68.26% to within 2.7 degrees, 55.69% to within 1.8 degrees, and 32.34% to within 0.9 degrees. After the new azimuthal angles are generated by hyperalignment, they are used to generate additional initial 3D models.

FIG. 16. The effect of noise on vertex class contamination. The first row gives a signal to noise ratio (SNR) value. The second row gives an example of the test image with this noise level added. Rows 3 6 show the effect of changing N on the percentage of vertex class contamination. For example, a value of 12.5% means that 12.5% of the images mapped to the corresponding vertex is contamination from other classes.

REFERENCES

1. Bonetta, L., 2005. Zooming in on electron tomography. Nature Methods 2, 139-144.
2. Boonstra, A. F., Germeroth, L., Boekema, E. J., 1994. Biochimica et Biophysica Acta 1184, 227.
3. Bottcher, B., Wynne, S. A., Crowther, R. A., 1997. Determination of the fold of the core protein of hepatitis B virus by electron cryomicroscopy. Nature 386, 88-91.
4. Cheng, A., van Hoek, A. N., Yeager, M., Verkman, A. S., Mitra, A. K., 1997. Three-dimensional organization of a human water channel. Nature 387, 627-630.
5. Deco, G., Obradovic, D., 1996. An information-theoretic approach to neural computing. Springer-Verlag, New York.
6. Del Camino, D., Yellen, G., 2001. Tight steric closure at the intracellular activation gate of a voltage-gated K+ channel. Neuron 32, 649-656.
7. Dutzler, R., Campbell. E. B., Cadene M, Chait, B. T., MacKinnon, R., 2002. X-ray structure of a CIC chloride channel at 3.0 A reveals the molecular basis of anion selectivity. Nature 415, 287-294.
8. Erwin, E., Obermayer, K., Schulten, K., 1992. Self-organizing maps: ordering, convergence properties and energy functions. Biological Cybernetics 67, 47-55.
9. Eskandari, S., Wright, E. M., Kreman, M., Starace, D. M., Zampighi, G., 1998. Structural analysis of cloned plasma membrane proteins by freeze-fracture electron microscopy. Proc. Natl. Acad. Sci. USA 95, 11235-11240.
10. Eskandari, S., Kreman, M., Kavanaugh, M. P., Wright, E. M., Zampighi, G. A., 2000. Pentameric assembly of a neuronal glutamate transporter. Proc. Natl. Acad. Sci. USA 97, 8641-8646.
11. Frank, J., 1996. Three-Dimensional Electron Microscopy of Macromolecular Assemblies. Academic Press, New York.
12. Gonen, T., Sliz, P., Kistler, J., Cheng, Y., Walz, T., 2004. Aquaporing-0 membrane junctions reveal the structure of a closed water pore. Nature 429, 193-197.
13. Harauz, Z., Ottensmeyer, F. P., 1984. Nucleosome reconstruction via phosphorus mapping. Science 226, 936-940.
14. Kohonen, T., 1982. Self-organized formation of topologically correct feature maps. Biol. Cybern. 43, 59-69.
15. Kohonen, T., 2001. Self-Organizing Maps, 3rd ed, Springer Series in Information Sciences, Heidelberg, p. 161.
16. Konig, N., Zampighi, G. A., Butler, P. J., 1997. Characterization of the major intrinsic protein (MIP) from bovine lens fibre membranes by electron microscopy and hydrodynamics. J. Mol. Biol. 265, 590-602.
17. Lanzavecchia, S., Bel lon, P. L., Radermacher, M., 1999. Fast and accurate three-dimensional reconstruction from projections with random orientations via Radon transforms. J. Struct. Biol. 128, 152-164.
18. Marabini, R., Masegosa, I. M., San Martin, M. C., Marco, S., Fernandez, J. J., de la Fraga, L. G., Vaquerizo, C., Carazo, J. M., 1996. Xmipp: an image processing package for electron microscopy. J. Struct. Biol. 116, 237-241.
19. Mori, M. X., Erickson, M. J., Yue, D. T., 2004. Functional stoichiometry and local enrichment of calmodulin interacting with Ca2+ channels. Science 304, 432-435.
20. Morris, E. P., Katayama, E., Squire, J. M., 1994. Evaluation of high-resolution shadowing applied to freeze-fractured, deep-etched particles: 3-D helical reconstruction of shadowed actin filaments. J. Struct. Biol. 113, 45-55.
21. Murata, K., Mitsuoka, K., Hirai, T., Walz, T., Agre, P., Heymann, J. B., Engel, A., Fujiyoshi, Y., 2000. Structural determinants of water permeation through aquaporin-1. Nature 407, 599-605.
22. Nemeth-Cahalan, K., Hall, J. E., 2000. pH and calcium regulate the water permeability of aquaporin 0. J. Biol. Chem. 275, 6777-6.782.
23. Nemeth-Cahalan, K. L., Kalman, K., Hall, J. E., 2004. Molecular basis of pH and Ca2+ regulation of aquaporin water permeability. J. Gen. Physio J. 123, 573-580.
24. Oliver, D., Cheng-Chang, 1., Soom, M., Baukrowitz, T., Jonas, P., Fakler, B., 2004. Functional conversion between A-type and delayed rectifier K+ channels by membrane lipids. Science 304, 265-270.
25. Pascual, A., Barcena, M., Merelo, J. J., Crazo, J. M., 2000. A novel neural network for analysis and classification of EM single-particle images. Ultramicroscopy 84, 85-89.
26. Pascual-Montano, A., Donate, L. E., Valle, M., Barcena, M., Pascual-Marqui, R. D., Carazo, J. M. 2001. A novel neural network for analysis and classification of EM single-particle images. J. Struct. Biol. 133, 233-245.
27. Penczek, P., Radermacher, M., Frank, J., 1992. Three-dimensional reconstruction of single particles embedded in ice. Ultramicorscopy 40, 33-53.
28. Radermacher, M., Wagenknecht, T., Verschoor, A., Frank, J., 1987. Three-dimensional reconstruction from a single-exposure random conical tilt series applied to the SOS ribosomal subunit of *Escherichia coli*. J. Microsc. 146, 113-136.
29. Radermacher, M., 1988. Three-dimensional reconstruction of single particles from random and non-random tilt series. J. Electron Microsc. Tech. 9, 359-394.
30. Sigworth, F. J. 2001, Potassium channel mechanics. Neuron 32, 555-556.
31. Sui, H., Han, B. G., Lee, J. K., Wallan, P., Jap, B. K., 2001. Structural basis of water-specific transport through the AQP1 water channel. Nature 414, 872-878.
32. Ueno, Y., Sato, C., 2001. Three-dimensional reconstruction of single particle electron microscopy: the voltage sensitive sodium channel structure. Science Progress 84 (4), 291-309.
33. van Heel, M., 1987. Similarity measures between images. Ultramicrosc. 21, 95-100.
34. van Heel, M., Harauz, G., Orlova, E. V., 1996. A new generation of IMAGIC image processing system. J. Struct. Biol. 116, 17-24.
35. van Heel, M., Gowen, B., Matadeen, R., Orlova, E. V., Finn, R., Pape, T., Cohen, D., Stark, H., Schmidt, R., Schatz, M. and Patwardhan, A., 2000. Single-particle electron cryo-microscopy: towards atomic resolution. Quarterly Rev. Biophysics 33, 307-369.
36. Walter, J., Ritter, H., 1996. Rapid learning with parametrized self-organizing maps. Neurocomputing, 12, 131-153.
37. Woodward, J. T., Zasadzinski, J. A., 1996. Thermodynamic limitations on the resolution obtainable with metal replicas. J. Microsc. 184, 157-162.
38. Yi, B. A., Jan, L. Y., 2000. Taking apart the gating of voltage-gated K+ channels. Neuron 27, 423-425.
39. Zagotta, W. N., Hoshi, T., Aldrich, R. W., 1990. Restoration of inactivation in mutants of Shaker potassium channels by a peptide derived from ShB. Science 250, 568-571.
40. Zampighi, G. A, Kreman, M., Lanzavecchia, S., Turk, E., Eskandari, E., Zampighi, L., Wright, E. M., 2003. Structure of functional AQPO channels in phospholipid bilayers. J. Mol. Biol. 325, 201-210.
41. Zampighi, L., Kavanau, C., Zampighi, G. A., 2004. The Kohonen self-organizing map: a tool for the clustering and alignment of single particles imaged using random conical tilt. J. Struct. Biol. 146, 368-380.

Although the invention has been described with reference to the above examples, it will be understood that modifications and variations are encompassed within the spirit and scope of the invention. Accordingly, the invention is limited only by the following claims.

What is claimed is:

1. A system for aligning and classifying images of an object, comprising:
   one or more processors configured to:
   train, map, and align a set of 2-dimensional images to an O-dimensional cylindrical topology to obtain azimuthal angles with respect to the 2-dimensional images;
   train and map the aligned 2-dimensional images to an N-dimensional topology to obtain a set of $2^N$ vertex classifications;
   map the 2-dimensional images to M-dimensional constructs based upon the set of $2^N$ vertex classifications and the azimuthal angles; and
   display a reconstructed mold of the object for classification.

* * * * *